(12) United States Patent
Huang et al.

(10) Patent No.: US 12,086,007 B2
(45) Date of Patent: Sep. 10, 2024

(54) CONTROL METHOD AND CONTROL APPARATUS FOR POWER SUPPLY APPARATUS IN DATA CENTER

(71) Applicant: Huawei Digital Power Technologies Co., Ltd., Shenzhen (CN)

(72) Inventors: Zhuyong Huang, Dongguan (CN); Xiaofei Zhang, Dongguan (CN)

(73) Assignee: HUAWEI DIGITAL POWER TECHNOLOGIES CO., LTD., Guangdong (CN)

( * ) Notice: Subject to any disclaimer, the term of this patent is extended or adjusted under 35 U.S.C. 154(b) by 122 days.

(21) Appl. No.: 17/852,527

(22) Filed: Jun. 29, 2022

(65) Prior Publication Data

US 2022/0326754 A1   Oct. 13, 2022

Related U.S. Application Data

(63) Continuation of application No. PCT/CN2020/111950, filed on Aug. 28, 2020.

(30) Foreign Application Priority Data

Dec. 31, 2019   (CN) .......................... 201911418686.5

(51) Int. Cl.
    *H02J 9/00*   (2006.01)
    *G06F 1/30*   (2006.01)
    *H02J 9/06*   (2006.01)

(52) U.S. Cl.
    CPC ............... *G06F 1/30* (2013.01); *H02J 9/002* (2013.01); *H02J 9/06* (2013.01)

(58) Field of Classification Search
    CPC .. G06F 1/30; G06F 1/263; H02J 9/002; H02J 9/06; H02J 2310/16; H02J 9/061; H02J 1/106; H02J 9/00; Y04S 20/20
    See application file for complete search history.

(56) References Cited

U.S. PATENT DOCUMENTS 9,236,768 B2   1/2016   Giuntini et al.
10,432,017 B1  10/2019  Morales et al.
(Continued)

FOREIGN PATENT DOCUMENTS

CN   101777785 A   7/2010
CN   202050284 U   11/2011
(Continued)

*Primary Examiner* — Lincoln D Donovan
*Assistant Examiner* — Alex W Lam
(74) *Attorney, Agent, or Firm* — WOMBLE BOND DICKINSON (US) LLP

(57) ABSTRACT

This application provides a power supply method for a data center. The data center includes a first device and at least one second device, an importance of a first service in the first device is higher than an importance of a second service in the at least one second device, and the second service in the at least one second device is transferable. A power supply apparatus includes a first uninterruptible power supply UPS and a second UPS, the first UPS is configured to control a first power source and a first energy storage apparatus to supply power to the first device, and the second UPS is configured to control the first power source and a second energy storage apparatus to supply power to the at least one second device.

20 Claims, 13 Drawing Sheets

(56) References Cited

U.S. PATENT DOCUMENTS

2013/0154377 A1* 6/2013 Isomura .................... H02J 9/04
307/65
2015/0323974 A1 11/2015 Shuster et al.

FOREIGN PATENT DOCUMENTS

| | | | |
|---|---|---|---|
| CN | 105529699 | A | 4/2016 |
| CN | 106356841 | A | 1/2017 |
| CN | 107273203 | A | 10/2017 |
| CN | 107394883 | A | 11/2017 |
| CN | 107579592 | A | 1/2018 |
| CN | 107769364 | A | 3/2018 |
| CN | 108988479 | A | 12/2018 |
| CN | 109256836 | A | 1/2019 |
| CN | 111082508 | A | 4/2020 |
| JP | 5347415 | B2 | 11/2013 |
| WO | 2014012120 | A1 | 1/2014 |
| WO | 2017131665 | A1 | 8/2017 |
| WO | 2017173926 | A1 | 10/2017 |

* cited by examiner

CONTROL METHOD AND CONTROL APPARATUS FOR POWER SUPPLY APPARATUS IN DATA CENTER

CROSS-REFERENCE TO RELATED APPLICATIONS

This application is a continuation of International Application No. PCT/CN2020/111950, filed on Aug. 28, 2020, which claims priority to Chinese Patent Application No. 201911418686.5, filed on Dec. 31, 2019. The disclosures of the aforementioned applications are hereby incorporated by reference in their entireties.

TECHNICAL FIELD

This application relates to the power supply field, and in particular, to a control method and a control apparatus for a power supply apparatus in a data center.

BACKGROUND

A construction scale of data centers increases year by year. In large and medium-sized cities, energy consumption of data centers is increasingly high. To ensure normal service running of each device in a data center, power supply of each device needs to be ensured, and a redundancy may be disposed in a power supply system of the data center, to prevent a power failure problem of a device in the data center and ensure normal service running in the data center. However, disposing the redundancy in the power supply system leads to low utilization of electrical energy supplied by the power supply system to the data center.

SUMMARY

This application provides a control method and a control apparatus for a power supply apparatus in a data center, to perform priority division on devices in the data center. When a quantity of electricity of a first energy storage apparatus that supplies power to a first device is low, power that is input by a first power source to a second UPS is reduced; and the second UPS supplies power to at least one second device, and a service in the second device is transferable and has a lower priority. This ensures normal running of a service with a higher priority in the first device, and improves power utilization of the first power source.

The second device may include a communications interface. The service in the second device is transferable in a wired or wireless manner.

According to a first aspect, a control method for a power supply apparatus in a data center is provided. The data center includes a first device and at least one second device, importance of a service in the first device is higher than importance of a service in each second device, and the service in each second device is transferable. The power supply apparatus includes a first uninterruptible power supply UPS and a second UPS, the first UPS is configured to control a first power source and a first energy storage apparatus to supply power to the first device, and the second UPS is configured to control the first power source and a second energy storage apparatus to supply power to the at least one second device. The method includes: when a quantity of electricity of the first energy storage apparatus is less than or equal to a first preset quantity of electricity, reducing first input power that is input by the first power source to the second UPS.

The first energy storage apparatus supplies supplementary power to the first device, and the power source and the first energy storage apparatus jointly supply power to the first device. When power supplied by the power source cannot meet a power requirement of the first device, an insufficient power part is supplied by the first energy storage apparatus to the first device.

Devices are classified based on service priorities of the devices. A service priority of the first device is higher, and the service in the second device is transferable. When the quantity of electricity of the power storage apparatus corresponding to the first device is insufficient, input power corresponding to the at least one second device is reduced, to improve power utilization while ensuring service running of the first device.

Because the service in the at least one second device is transferable, when supplied power of the at least one second device is insufficient, the service is transferred, so that service running of the at least one second device may not be interrupted for a long time, and impact of reduced input power on the service running of the at least one second device is reduced. The first power source supplies power to the first device and the at least one second device. Because the service in the second device is transferable, impact on the service in the second device can be reduced while improving the power utilization of the first power source.

With reference to the first aspect, in some possible embodiments, the first preset quantity of electricity is used to indicate a quantity of electricity needed when duration of service running of the first device is greater than or equal to preset duration.

With reference to the first aspect, in some possible embodiments, the method further includes: when the quantity of electricity of the first energy storage apparatus is greater than a second preset quantity of electricity, stopping reducing the input power that is input by the first power source to the second UPS, where the second preset quantity of electricity is greater than or equal to the first preset quantity of electricity.

By stopping reducing the power-source power corresponding to the at least one second device, normal power supply for the second device can be restored, and the impact on the service in the second device can be reduced.

With reference to the first aspect, in some possible embodiments, the method further includes: when a quantity of electricity of the second energy storage apparatus is less than a third preset quantity of electricity, sending transfer indication information to at least one target second device in the at least one second device, where the transfer indication information is used to indicate the at least one target second device to transfer a service.

When the at least one target second device is some of the at least one second device, the service in the target second device is transferable to a second device in the at least one second device other than the at least one target second device, or is transferable to the first device, or is transferable to a device in the data center other than the first device and the at least one second device. Preferably, the service in the target second device is transferable to a device whose service is transferable.

When the quantity of electricity of the second energy storage apparatus cannot meet a requirement, the second device is indicated to transfer the service, so that the impact on the service in the second device can be reduced.

With reference to the first aspect, in some possible embodiments, a time in which the third preset quantity of electricity supports running of the at least one target second device is greater than or equal to a transfer time of the service in the at least one target second device.

When the quantity of electricity of the second energy storage apparatus drops to the third preset quantity of electricity that supports service transfer, the second device is indicated to transfer the service, to ensure that all services in the second device are transferred, thereby reducing the impact on the service in the second device.

With reference to the first aspect, in some possible embodiments, before the input power that is input by the first power source to the second UPS is reduced, a rated value of power that is input by the first power source to the first UPS is equal to average power of the first device.

No margin is set for the rated value of the power of the first power source, but the rated value is equal to the average power of the first device. This further improves the power utilization.

With reference to the first aspect, in some possible embodiments, the reducing input power that is input by the first power source to the second UPS includes: determining, based on a power requirement of the first device for the first power source, the input power that is input by the first power source to the second UPS.

The input power that is input by the first power source to the second UPS is adjusted based on the power requirement of the first device for the power source, to meet the power requirement of the first device.

The power requirement of the first device for the first power source may be understood as an instantaneous power requirement of the first device, or may be understood as average power of the first device within a short period of time, for example, several seconds. The first energy storage apparatus supplies supplementary power to the first device. The power requirement of the first device for the first power source can also be understood as a total power requirement for the first power source when the first energy storage apparatus is charged and the service in the first device runs.

With reference to the first aspect, in some possible embodiments, the data center further includes at least one third device. The power supply apparatus further includes a third UPS and a fourth UPS. The third UPS is configured to control a second power source and a third energy storage apparatus to supply power to the first device, and the fourth UPS is configured to control the second power source and a fourth energy storage apparatus to supply power to the at least one third device. The importance of the service in the first device is higher than importance of a service in each third device, and the service in each third device is transferable.

The method provided in the first aspect can be applied to an N+redundancy (N+R) power supply architecture.

A power supply module corresponding to the redundancy (redundancy, R) includes the third UPS and the fourth UPS. In a normal case, power that is input by the second power source to the fourth UPS is rated power of the second power source. When the third UPS supplies power to the first device, the third UPS may supply power to the first device by referencing the power supply manner of the first UPS, and the fourth UPS may supply power to the at least one third device by referencing the power supply manner of the second UPS.

With reference to the first aspect, in some possible embodiments, the data center further includes at least one third device. The power supply apparatus further includes a third UPS and a fourth UPS. The third UPS is configured to control a second power source and a third energy storage apparatus to supply power to the first device, and the fourth UPS is configured to control the second power source and a fourth energy storage apparatus to supply power to the at least one third device. The importance of the service in the first device is higher than importance of a service in each third device, and the service in each third device is transferable.

The method provided in the first aspect can be applied to a distribution redundancy (distribution redundancy, DR) power supply architecture.

A sum of rated power that is input by the first power source to the first UPS and rated power that is input by the second power source to the third UPS is equal to rated power of the first device. The rated power of the first device may be greater than or equal to the average power of the first device.

According to a second aspect, a control apparatus for a power supply apparatus in a data center is provided. The data center includes a first device and at least one second device, importance of a service in the first device is higher than importance of a service in each second device, and the service in each second device is transferable. The power supply apparatus includes a first uninterruptible power supply UPS and a second UPS, the first UPS is configured to control a first power source and a first energy storage apparatus to supply power to the first device, and the second UPS is configured to control the first power source and a second energy storage apparatus to supply power to the at least one second device. The control apparatus includes an obtaining module and an adjustment module. The obtaining module is configured to obtain a quantity of electricity of the first energy storage apparatus. The adjustment module is configured to: when the quantity of electricity of the first energy storage apparatus is less than or equal to a first preset quantity of electricity, reduce input power that is input by the first power source to the second UPS.

With reference to the second aspect, in some possible embodiments, the quantity of backup electricity is used to indicate a quantity of electricity needed when duration of service running of the first device is greater than or equal to preset duration.

With reference to the second aspect, in some possible embodiments, the adjustment module is further configured to: when the quantity of electricity of the first energy storage apparatus is greater than a second preset quantity of electricity, stop reducing the input power that is input by the first power source to the second UPS, where the second preset quantity of electricity is greater than or equal to the first preset quantity of electricity.

With reference to the second aspect, in some possible embodiments, the control apparatus further includes a transceiver module. The transceiver module is configured to: when a quantity of electricity of the second energy storage apparatus is less than a third preset quantity of electricity, send transfer indication information to at least one target second device in the at least one second device, where the transfer indication information is used to indicate the at least one target second device to transfer a service.

With reference to the second aspect, in some possible embodiments, a time in which the third preset quantity of electricity supports running of the at least one target second device is greater than or equal to a transfer time of the service in the at least one target second device.

With reference to the second aspect, in some possible embodiments, the adjustment module is configured to determine, based on a power requirement of the first device for the first power source, the input power that is input by the first power source to the second UPS.

With reference to the second aspect, in some possible embodiments, before the input power that is input by the first power source to the second UPS is reduced, a rated value of power that is input by the first power source to the first UPS is equal to average power of the first device.

With reference to the second aspect, in some possible embodiments, the power supply apparatus further includes a third UPS and a fourth UPS. The third UPS is configured to control a second power source and a third energy storage apparatus to supply backup electrical energy to the first device, and the fourth UPS is configured to control the second power source and a fourth energy storage apparatus to supply power to at least one third device. The importance of the service in the first device is higher than importance of a service in each third device, and the service in each third device is transferable.

With reference to the second aspect, in some possible embodiments, the data center further includes at least one third device. The importance of the service in the first device is higher than importance of a service in each third device, and the service in each third device is transferable.

The power supply apparatus further includes a third UPS and a fourth UPS. The third UPS is configured to control a second power source and a third energy storage apparatus to supply power to the first device, and the fourth UPS is configured to control the second power source and a fourth energy storage apparatus to supply power to the at least one third device.

It should be understood that the control module may be a controller in the first UPS or the second UPS, or may be a controller in another unit or device. The first UPS may communicate with the second UPS, to implement signal transmission between the first UPS and the second UPS.

According to a third aspect, a control apparatus for a power supply apparatus in a data center is provided. The apparatus includes a memory and a processor. The memory is configured to store a program. When executing the program, the processor is configured to implement the method according to the first aspect.

According to a fourth aspect, a computer storage medium is provided. When computer instructions are run on an electronic device, the electronic device is enabled to perform the method according to the first aspect.

According to a fifth aspect, a chip system is provided. The chip system includes at least one processor, and when program instructions are executed in the at least one processor, the chip system is enabled to perform the method according to the first aspect.

DESCRIPTION OF EMBODIMENTS

The following describes the technical solutions of this application with reference to the accompanying drawings.

Figure 1:
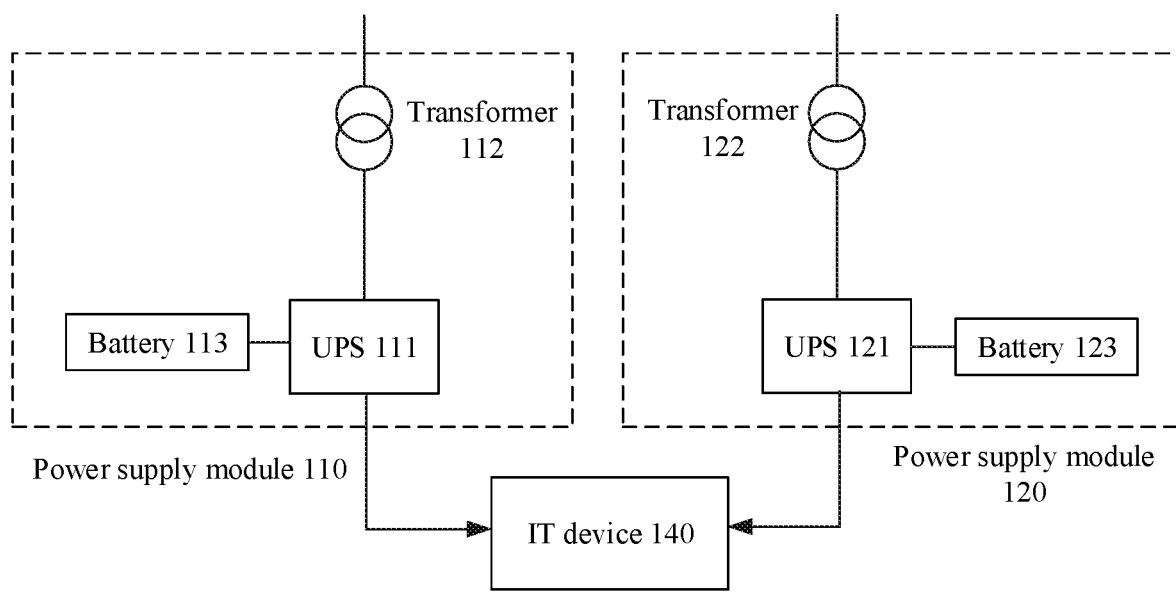
FIG. 1 is a schematic diagram of a power supply circuit in a data center.

FIG. 1 is a schematic diagram of a power supply circuit in a data center.

An uninterruptible power supply (UPS) keeps a load working normally and protects software and hardware of the load from damage. When an input is normal, after an input voltage of the UPS is stabilized, the input is supplied to the load for use and charges a battery. The input of the UPS may be a direct current (for example, high-voltage direct current (HVDC) transmission or a 48-volt (V) power supply product) or an alternating current. If the input of the UPS is a mains supply, the UPS is an alternating current voltage regulator in this case. When the input is interrupted (for example, a power failure due to an accident), the UPS immediately uses direct current electrical energy of the battery to supply power to the load. For example, the UPS may continue supplying a 220 V alternating current to the load by using an inverter switching method.

A data center is a device network collaborated globally, and is configured to transfer, accelerate, display, compute, and store data information on an information technology (IT) device in an Internet network. The IT device is a device that processes information by using an information technology. The IT device may be, for example, a server.

To ensure reliability, a large and medium-sized data center generally uses a 2N design. As shown in FIG. 1, two identical power supply modules may be provided for one server. In a power supply module 110, a battery 113 is connected to a UPS 111, and a mains supply is connected to the UPS 111 through a transformer 112. In a power supply module 120, a battery 123 is connected to a UPS 121, and the mains supply is connected to the UPS 121 through a transformer 122. An IT device 140 is a load of the UPS 111 and the UPS 121.

In the foregoing manner, utilization of a power supply system is low. Theoretically, relative to maximum power that can be supplied by the power supply system, maximum actual power utilization is only 50%.

In the data center, average power of each IT device is not high. However, when services surge, power of the IT device increases, and peak power may occur, which may be several times the average power. To ensure normal running of the server, that the power supply system of the server is supplied with sufficient power is to be ensured. Therefore, a specific margin may be designed for the power supply system of the data center. Rated power of the transformer 112 may be higher than average power of the IT device 140, for example, may be 1.1 to 1.3 times the average power of the IT device 140. However, setting the power margin leads to lower utilization of the power supply system.

In recent years, a construction scale of data centers increases year by year, and an energy consumption rate of the data centers is increasing rapidly. Especially in large and medium-sized cities, utilization of power supply systems of data centers may be improved. The utilization of the power supply systems of the data centers can be improved in a distributed redundancy (DR) or N+redundancy (N+R) manner.

Figure 2:
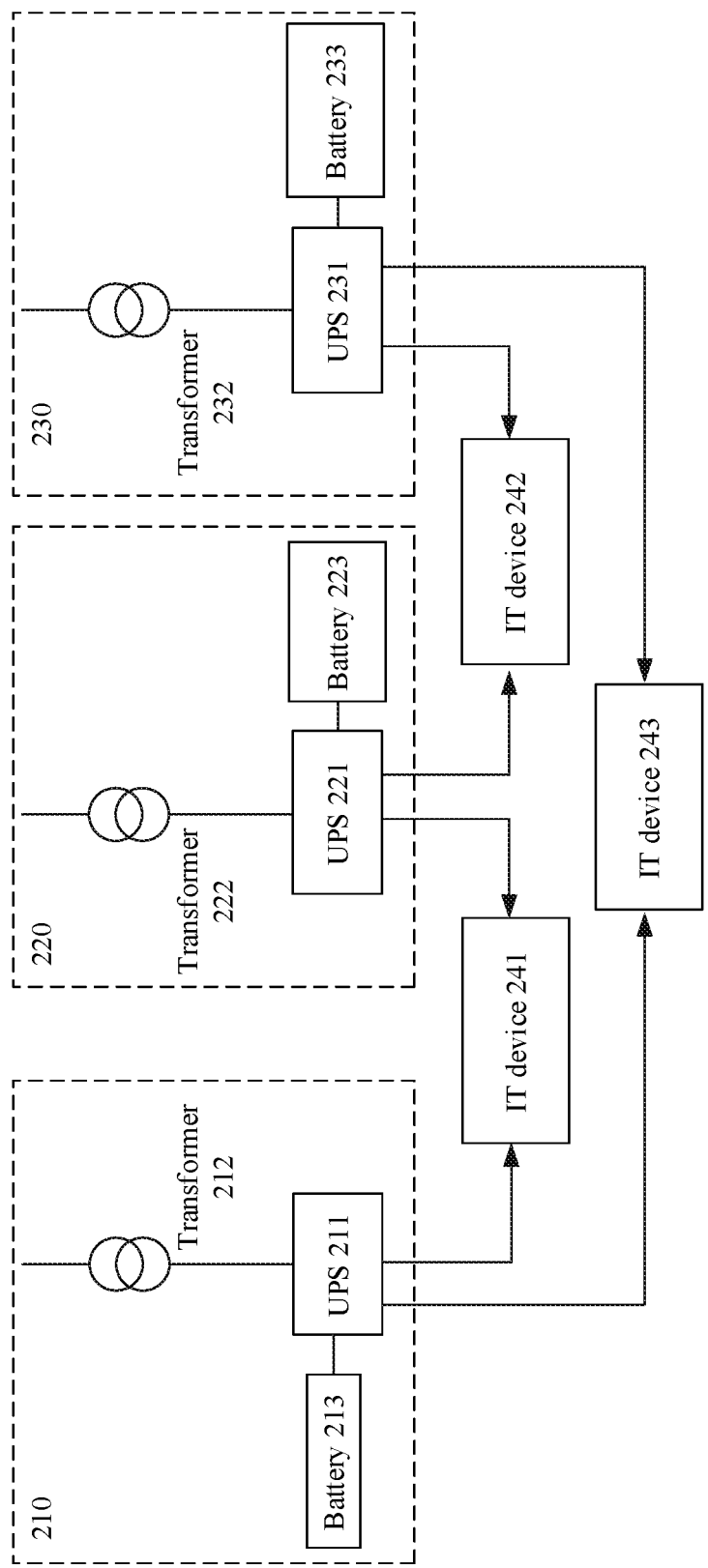
FIG. 2 is a schematic diagram of a distribution redundancy power supply architecture.

FIG. 2 is a schematic diagram of a distribution redundancy power supply architecture.

A power supply module 210, a power supply module 220, and a power supply module 230 supply power to an IT device 241, an IT device 242, and an IT device 243. The power supply module 210 includes a UPS 211, a transformer 212, and a battery 213. The power supply module 220 includes a UPS 221, a transformer 222, and a battery 223. The power supply module 230 includes a UPS 231, a transformer 232, and a battery 233.

A capacity of each IT device is A. A capacity may also be referred to as rated power. Power supply modules have an equal capacity being 1.5 A. In other words, output power of a transformer in each power supply module is 1.5 A. Input power of a transformer is equal to output power of the transformer, which may be understood as power supplied by a power source. Generally, the output power of the transformer is a fixed value.

Each IT device is supplied by each of two power supply modules roughly with half of power, which is approximately 0.5 A. Therefore, without considering a power margin, maximum power utilization of the DR architecture including three buses (that is, the three power supply modules) is 66.67%. When any one of the three power supply modules is faulty or is being maintained and no longer supplies power to IT devices, the other two power supply modules supply power to the IT devices. Therefore, the IT devices are not powered off.

The DR architecture may alternatively include four or more power supply modules. M power supply modules supply power to (M−1) IT devices. Power utilization of the power supply system is as follows:

$$\eta = \frac{M-1}{M},$$

where M is a positive integer.

A larger quantity of power supply modules indicates higher power utilization of the power supply system.

Figure 3:
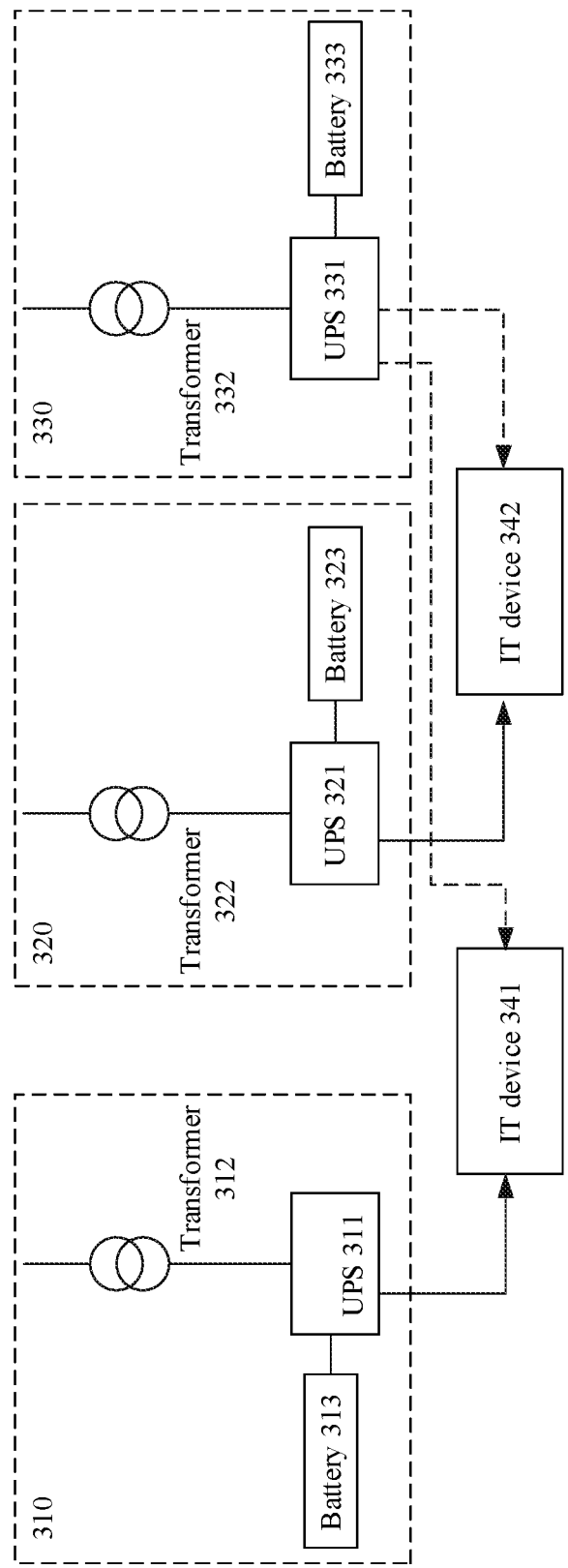
FIG. 3 is a schematic diagram of an N+redundancy power supply architecture.

FIG. 3 is a schematic diagram of an N+redundancy (R) power supply architecture. In the architecture shown in FIG. 3, N is equal to 2.

A power supply module 310 is a main power supply module of an IT device 341, and a power supply module 320 is a main power supply module of an IT device 342. The power supply module 310 includes a UPS 311, a transformer 312, and a battery 313, and the power supply module 320 includes a UPS 321, a transformer 322, and a battery 323.

A power supply module 330 is a standby power supply module of the IT device 341 and the IT device 342. The power supply module 330 includes a UPS 331, a transformer 332, and a battery 333.

A capacity of each IT device is A. Power supply modules have an equal capacity being A. In other words, output power of a transformer in each power supply module is A. The output power of the transformer can also be understood as power of a power source. Generally, the output power of the transformer is a fixed value.

When one of the power supply module 310 and the power supply module 320 is faulty or is being maintained and cannot supply power to a corresponding IT device, the power supply module 330 supplies power to the IT device.

Therefore, if any one of the three power supply modules is faulty or is being maintained, the IT devices are not powered off.

Utilization of a 2+R architecture infrastructure is 66.67%.

The N+R power supply architecture may be a 2+R system including three power supply modules, or may include four or more power supply modules. N power supply modules supply power to (N−1) IT devices. Power utilization of the power supply system is as follows:

$$\eta = \frac{N-1}{N},$$

where N is a positive integer.

A larger quantity of power supply modules indicates higher power utilization of the power supply system.

According to the descriptions in FIG. 1 to FIG. 3, without considering impact of a power margin, compared with the 2N power supply architecture, the DR power supply architecture and the N+R power supply architecture can effectively improve the power utilization of the power supply system, and can improve the power utilization of the power supply system from 50% to 66.7% or higher.

The power utilization of the DR power supply architecture and the power utilization of the N+R power supply architecture are related to a quantity of power supply modules. A larger quantity of power supply modules indicates higher power utilization of the power supply architecture.

However, reliability of the DR power supply architecture and the N+R power supply architecture is low. The 2N system is equivalent to a 1+1 standby system. If reliability of a power supply module is 0.9, reliability of the 2N power supply architecture is as follows:

$$1-(1-0.9)^2=0.99$$

Reliability of the DR power supply architecture or the N+R power supply architecture in which the three power supply modules supply power is as follows:

$$0.9^3+C_3^1 \times 0.9^2 \times (1-0.9)^1 = 0.972$$

More power supply modules in the power supply architecture indicate lower costs, but have lower reliability. It can be learned that both the DR power supply architecture and the N+R power supply architecture improve a redundancy of the power supply modules at the cost of system reliability, to improve the power utilization of the power supply system.

To reduce impact on services in a data center and improve user experience while improving power utilization of a power source, an embodiment of this application provides a power supply method.

Figure 4:
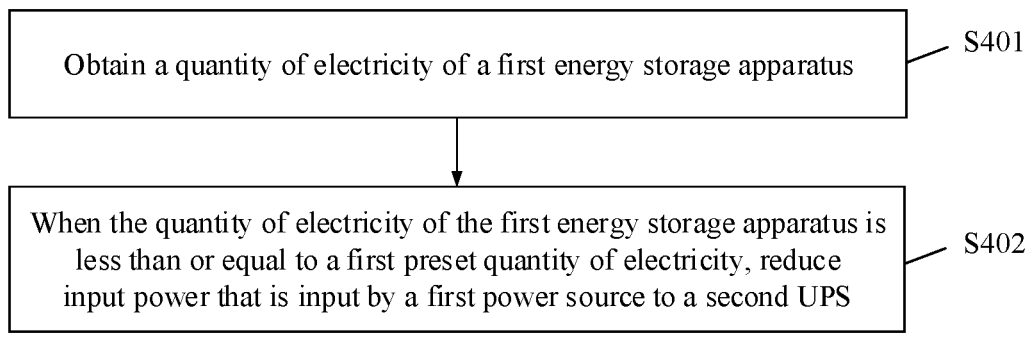
FIG. 4 is a schematic flowchart of a power supply method for a data center according to an embodiment of this application.

FIG. 4 is a schematic flowchart of a power supply method for a data center according to an embodiment of this application.

The data center includes a first device and at least one second device, and the data center may further include another device. The first device and the at least one second device may be devices of a same type or different types.

Operation S401 and operation S402 may be performed by a processor such as a controller. The controller may be, for example, a controller in a UPS unit, or may be located in another unit or device. The UPS unit may supply power to the first device and the at least one second device.

Importance of a service in the first device is higher than importance of a service in each second device. The service in the first device may be different from the service in the at least one second device. The service in the first device may be a cloud rental service and/or a private cloud service, and the service in the second device may be a public cloud service. In other words, the service in the second device is transferable. The first device may be understood as an important device, and the second device may be understood as a less important device.

The second device may include a communications interface. The service in the second device is transferable in a wired or wireless manner. The service in the second device may be implemented by using various communications systems, for example, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

A power supply apparatus is configured to supply power to the devices in the data center. The power supply apparatus may include a first uninterruptible power supply UPS and a second UPS. The first UPS may be configured to control a first power source and a first energy storage apparatus to supply power to the first device. The second UPS may be configured to control the first power source and a second energy storage apparatus to supply power to the at least one second device. The first energy storage apparatus may supply supplementary power to the first device. To be specific, when power supplied by the first power source cannot meet a power requirement of the first device, an insufficient power part is supplied by the first energy storage apparatus to the first device. The second energy storage apparatus may supply supplementary power to the at least one second device. That the power supplied by the first power source cannot meet the power requirement of the first device means that instantaneous power of the first device is higher than instantaneous power that is input by the first power source to the first UPS.

Generally, a sum of input power that is input by the first power source to the first UPS and the input power that is input by the first power source to the second UPS may be equal to a value of the power supplied by the first power source. It should be understood that "equal to" may be alternatively "approximately equal to". Generally, the value of the power supplied by the power source is fixedly rated power of the power source. In some cases, the value of the power supplied by the power source may be less than the rated power of the power source.

Operation S401: Obtain a quantity of electricity of the first energy storage apparatus.

Whether first power-source power supplied by the first power source to the first device within a period of time is sufficient may be determined based on the quantity of electricity of the first energy storage apparatus.

The first power-source power may be a power part that is in power supplied by the power source and that is supplied to the first device.

The UPS unit may include the first UPS and the second UPS. The first UPS may implement joint power supply performed by the first energy storage apparatus and the first power source on the first device. When the first power-source power is higher than an instantaneous electric power requirement of the first device, a part that is left after the first power-source power is used to supply power to the first device may charge the first energy storage apparatus.

Operation S401 and operation S402 may be performed by the first UPS and/or the second UPS.

The energy storage apparatus may be a battery, a flywheel, or another device having an electrical energy storage function.

When the power that is input by the first power source to the first UPS is a rated value, and the power that is input by the first power source to the first UPS is lower than a real-time power requirement of the first device, the first energy storage apparatus supplies supplementary power, to meet the real-time power requirement of the first device. When the power that is input by the first power source to the first UPS is higher than a real-time power requirement of the first device, the power that is input by the first power source to the first UPS is supplied to the first device to maintain running of the first device, and may be further supplied to the first energy storage apparatus, so that the first energy storage apparatus is charged.

The second UPS may implement joint power supply performed by the second energy storage apparatus and the first power source on the second device.

That the first power-source power is insufficient may be determined by the first UPS or the second UPS. Power consumption of the first device within a period of time may be detected to determine electrical energy consumed by the first device. Operation S402 may be performed when electrical energy consumed by the first device within a preset period of time is greater than a preset consumption amount.

Alternatively, that the first power-source power is insufficient may be determined by detecting the quantity of electricity of the first energy storage apparatus.

The first UPS may detect the quantity of electricity of the first energy storage apparatus. When determining that the quantity of electricity of the first energy storage apparatus is less than or equal to a first preset quantity of electricity, the first UPS may determine that the power that is input by the first power source to the first UPS is insufficient.

Within a period of time, if the real-time power requirement of the first device is high, a time in which the first energy storage apparatus supplies supplementary power is long, and the quantity of electricity of the first energy storage apparatus decreases. When the quantity of electricity of the first energy storage apparatus is less than or equal to the first preset quantity of electricity, operation S402 may be performed.

Before operation S401 is performed, the power that is input by the first power source to the first UPS may be the rated value. That the power that is input by the first power source to the first UPS is insufficient means that the rated value of the power that is input by the first power source to the first UPS cannot meet the power requirement of the first device. The rated value of the power that is input by the first power source to the first UPS may be greater than or equal to average power of the first device. The rated value of the power that is input by the first power source to the first UPS may be alternatively rated power of the first device.

The first preset quantity of electricity may also be referred to as a quantity of backup electricity, and may be a preset quantity value of electricity. The first preset quantity of electricity is used to indicate a quantity of electricity needed when duration of service running of the first device is greater than or equal to preset duration. The preset duration may also be referred to as a backup electricity time. The preset duration of the service running of the first device can also be understood as preset duration of running of the first device.

The first preset quantity of electricity may be determined based on the backup electricity time t in which the first energy storage apparatus can support running of the first device. Generally, the first preset quantity Q of electricity of the first energy storage apparatus can support running of the first device for 5 to 10 minutes. If the rated power of the first device is Pa, the first preset quantity of electricity of the first energy storage apparatus is Q=Pa×t.

Operation S402: When the quantity of electricity of the first energy storage apparatus is less than or equal to the first preset quantity of electricity, reduce input power that is input by the first power source to the second UPS.

A target second device is a second device. At least one target second device may be all or some of the at least one second device.

In some embodiments, the power that is input by the first power source to the first UPS may be a fixed value, and the power that is input by the first power source to the second UPS may be a fixed value. When the first UPS determines that the power that is input by the first power source to the first UPS is insufficient, the first UPS may send quantity-of-electricity indication information to the second UPS. After receiving the quantity-of-electricity indication information, the second UPS may start to supply power to the first device. In other words, before operation S402 is performed, the first UPS supplies power to the first device, and the second UPS supplies power to the at least one second device; and after operation S402 is performed, both the first UPS and the second UPS supply power to the first device. It should be understood that, when supplying power to the first device, the second UPS may supply power to the at least one second device, or may stop supplying power to the at least one second device.

The power source with constant power may supply power to the first UPS and the second UPS. In this case, the sum of the power that is input by the first power source to the first UPS and the power that is input by the first power source to the second UPS may be a fixed value. The sum of the power that is input by the first power source to the first UPS and the power that is input by the first power source to the second UPS may be an output of a transformer connected to the power source. The output of the transformer is less than or equal to rated power of the transformer. Generally, the output power of the transformer is the rated power.

In some embodiments, before operation S401 is performed, the power that is input by the first power source to the first UPS may be limited to the rated power of the first device. Therefore, the power that is input by the first power source to the second UPS is power of the power source minus the limit value of the power that is input by the first power source to the first UPS.

When the first UPS determines that the power that is input by the first power source to the first UPS is insufficient, the limitation on the power that is input by the first power source to the first UPS may be canceled, or the limit value of the input power may be increased, so that the power that is input by the first power source to the second UPS, that is, power supplied by the first power source to the at least one second device is reduced. It should be understood that the second UPS may reduce the power supplied by the first power source to the at least one target second device. The at least one target second device may be all or some of the at least one second device.

It should be understood that the second UPS may include one or more second UPS parts, the second energy storage apparatus may include one or more second energy storage parts, and the second UPS parts may be in a one-to-one correspondence with the second energy storage parts. A second UPS part may be configured to control the first power source and a second energy storage part corresponding to the second UPS part to supply power to one or more second devices. The power supplied by the first power source to the at least one target second device, that is, power that is input by the first power source to at least one second UPS part corresponding to the at least one target second device is reduced. A second device other than the target second device may be supplied with power in the foregoing manner.

After the limitation on the power that is input by the first power source to the first UPS is canceled, the power that is input by the first power source to the first UPS is determined based on the power requirement of the first device. Certainly, after the limitation on the power that is input by the first power source to the first UPS is canceled, the power that is input by the first power source to the first UPS may be alternatively determined based on a charging requirement of the energy storage apparatus corresponding to the first device.

In some other embodiments, the power that is input by the first power source to the second UPS may be limited, and the power that is input by the first power source to the first UPS is determined based on the power that is input by the first power source to the second UPS. In other words, the power that is input by the first power source to the first UPS is equal to the power of the power source minus a limit value of the input power of the second UPS. The limit value of the input power of the second UPS may be determined based on the power of the power source and the rated power of the first device.

When the first UPS determines that the power that is input by the first power source to the first UPS is insufficient, the first UPS may send quantity-of-electricity indication information to the second UPS. After receiving the quantity-of-electricity indication information, the second UPS reduces the limit value of the input power, to reduce the power that is input by the first power source to the second UPS. Alternatively, after receiving the quantity-of-electricity indication information, the second UPS limits the input power of the second UPS to the power of the power source minus the power that is input by the first power source to the first UPS. The power that is input by the first power source to the first UPS is determined based on the power requirement of the first device. After the limitation on the power that is input by the first power source to the second UPS is canceled, the power that is input by the first power source to the second UPS may be alternatively determined based on a charging requirement of the energy storage apparatus corresponding to the second device.

Alternatively, both the power that is input by the first power source to the first UPS and the power that is input by the first power source to the second UPS may be limited. When the first UPS determines that the power that is input by the first power source to the first UPS is insufficient, the first UPS cancels the limitation on the power that is input by the first power source to the first UPS, and sends quantity-of-electricity indication information to the second UPS. The second UPS receives the quantity-of-electricity indication information, and reduces the power that is input by the first power source to the second UPS.

The quantity-of-electricity indication information may be used to indicate that the quantity of electricity of the first energy storage apparatus is less than the first preset quantity of electricity, or indicate that the power that is input by the first power source to the first UPS is insufficient. Alternatively, the quantity-of-electricity indication information may be used to indicate to reduce the power that is input by the first power source to the second UPS. The quantity-of-electricity indication information may be further used to indicate the at least one target second device. The quantity-of-electricity indication information may be further used to indicate a manner of reducing the power that is input by the first power source to the second UPS.

A manner in which the sum of the power that is input by the first power source to the first UPS and the power that is input by the first power source to the second UPS is the fixed value can make the power supply method for the data center provided in this embodiment of this application compatible with an existing power supply architecture, thereby reducing costs of applying the power supply method provided in this embodiment of this application to the existing data center.

When the sum of the power that is input by the first power source to the first UPS and the power that is input by the first power source to the second UPS is the fixed value, there are a plurality of manners of reducing the power that is input by the first power source to the second UPS. The manner may be reducing the limit value of the power that is input by the first power source to the second UPS, or increasing the limit value of the power that is input by the first power source to the first UPS, or canceling the limitation on the power that is input by the first power source to the first UPS and adjusting, based on the power requirement of the first device, the power that is input by the first power source to the first UPS and the power that is input by the first power source to the second UPS.

In other words, the input power that is input by the first power source to the second UPS may be determined based on the power requirement of the first device for the first power source.

The input power that is input by the first power source to the second UPS is adjusted based on the power requirement of the first device for the power source, to meet the power requirement of the first device.

The power requirement of the first device for the first power source may be understood as the instantaneous power requirement of the first device, or may be understood as average power of the first device within a short period of time, for example, several seconds. The first energy storage apparatus supplies supplementary power to the first device. The power requirement of the first device for the first power source can also be understood as a total power requirement for the first power source when the first energy storage apparatus is charged and the service in the first device runs.

After the limitation on the power that is input by the first power source to the first UPS is canceled, the first UPS may charge the first energy storage apparatus when supplying power to the first device. Therefore, the power that is input by the first power source to the first UPS is increased. The sum of the power that is input by the first power source to the first UPS and the power that is input by the first power source to the second UPS may be the fixed value. The power that is input by the first power source to the second UPS is adjusted based on the power that is input by the first power source to the first UPS, to reduce the power that is input by the first power source to the second UPS.

Because the service in the second device is transferable, that the service in the second device cannot run due to a power failure can be prevented.

When a quantity of electricity of the second energy storage apparatus is less than a third preset quantity of electricity, transfer indication information is sent to the at least one target second device in the at least one second device, where the transfer indication information is used to indicate the at least one target second device to transfer a service.

The UPS unit may detect the quantity of electricity of the second energy storage apparatus, and the second energy storage apparatus is configured to supply power to the at least one second device. When the quantity of electricity of the second energy storage apparatus is less than the third preset quantity of electricity, the UPS unit sends the transfer indication information to the at least one target second device in the at least one second device, where the transfer indication information is used to indicate the at least one target second device to transfer the service.

A time in which the third preset quantity of electricity supports running of the at least one target second device may be greater than or equal to a transfer time of the service in the at least one target second device. Therefore, all services in the at least one target second device are transferable, and that the service in the at least one target second device cannot run due to a power failure is prevented.

When there are a plurality of second devices, a quantity of target second devices may be determined based on a consumption rate of the quantity of electricity of the second energy storage apparatus. A higher consumption rate of the quantity of electricity of the first energy storage apparatus indicates a larger quantity of target second devices. A one-to-one correspondence between a consumption rate of the quantity of electricity of the first energy storage apparatus and a quantity of target second devices may be determined empirically, and the one-to-one correspondence relationship may be stored. When there are a plurality of second devices, the quantity of target second devices is determined from the plurality of second devices based on the consumption rate of the quantity of electricity of the first energy storage apparatus and the one-to-one correspondence between a consumption rate of the quantity of electricity of the first energy storage apparatus and a quantity of target second devices.

In the conventional technology, to avoid a problem of consuming the quantity of electricity of the energy storage apparatus when the first device runs above the average power for a period of time, a specific margin is usually set when the rated value of the power that is input by the first power source to the first UPS is set, so that the rated value of the power that is input by the first power source to the first UPS is greater than the average power of the first device.

In this embodiment of this application, the rated value of the power that is input by the first power source to the first UPS may be equal to the average power of the first device. "Equal to" can also be understood as "approximately equal to". No margin is set for the rated value of the power that is input by the first power source to the first UPS, but the rated value is equal to the average power of the first device. This can further improve power utilization.

In the method provided in this embodiment of this application, when the first device runs above the average power for a period of time, power supplied by the power source to the first device may be increased by reducing power-source power supplied by the power source to the at least one target second device. Therefore, the rated value of the power that is input by the first power source to the first UPS may be equal to the average power of the first device, so that power utilization of a power supply system is further improved.

After operation S402 is performed, the UPS unit may detect the quantity of electricity of the first energy storage apparatus.

When the quantity of electricity of the first energy storage apparatus is greater than a second preset quantity of electricity, reducing the input power that is input by the first power source to the second UPS is stopped, where the second preset quantity of electricity is greater than or equal to the first preset quantity of electricity.

In other words, when the quantity of electricity of the first energy storage apparatus exceeds the second preset quantity of electricity of the first energy storage apparatus, the UPS unit may stop reducing the power that is input by the first power source to the second UPS. The second preset quantity of electricity of the first energy storage apparatus may be greater than or equal to the first preset quantity of electricity of the first energy storage apparatus.

In other words, when the quantity of electricity of the first energy storage apparatus exceeds the second preset quantity of electricity of the first energy storage apparatus, the power that is input by the first power source to the first UPS may be limited to the rated value, or an increase in the rated value of the power that is input by the first power source to the first UPS may be canceled.

Therefore, after the quantity of electricity of the first energy storage apparatus reaches the second preset quantity of electricity of the first energy storage apparatus, the power that is input by the first power source to the second UPS may be restored.

After the quantity of electricity of the first energy storage apparatus reaches the second preset quantity of electricity of the first energy storage apparatus, the input power corresponding to the at least one target second device may be restored. Alternatively, after the quantity of electricity of the second energy storage apparatus reaches a preset quantity value of electricity of the second energy storage apparatus, the input power corresponding to the at least one target second device may be restored. The preset quantity value of electricity of the second energy storage apparatus may be greater than the third preset quantity of electricity of the second energy storage apparatus.

It should be understood that the second UPS may supply power to a plurality of second devices. The plurality of second devices are all devices in the data center.

When the quantity of electricity of the second energy storage apparatus is less than the third preset quantity of electricity, the UPS unit may send quantity-of-electricity indication information to all or some of the plurality of second devices. The all or some second devices are the at least one target second device. The second device that receives the quantity-of-electricity indication information may perform service transfer. A second device set that receives the quantity-of-electricity indication information may be referred to as a set 1, and a second device set that does not receive the quantity-of-electricity indication information may be referred to as a set 2.

The third preset quantity of electricity may be greater than or equal to a quantity of electricity needed to perform service transfer by a second device in the set 1, and a quantity of electricity needed by a second device in the set 2 during service transfer performed by the second device in the set 1 and the second device in the set 2.

In other words, the third preset quantity of electricity may be determined based on a manner of stopping supplying power to the plurality of second devices. The second UPS may stop supplying power to a plurality of target second devices sequentially or simultaneously. The second UPS may stop supplying power to all or some of the plurality of target second devices.

If the quantities of electricity of the second energy storage apparatus reaches the preset quantity value of electricity of the second energy storage apparatus, the plurality of second devices may start to be supplied with power sequentially or simultaneously.

A switch between the second UPS and each second device may be controlled to control the second UPS to start or stop supplying power to the second device. The switch between the second UPS and each second device may be disposed in a power distribution cabinet.

It should be understood that the UPS unit may detect whether the power that is input by the first power source to the first UPS is sufficient, that is, determine a status of the power that is input by the first power source to the first UPS. The UPS unit may adjust, based on the status of the power that is input by the first power source to the first UPS, the power-source power supplied by the power source to the all or some second devices.

The status of the power that is input by the first power source to the first UPS may include three states: power supply surplus, power supply sufficient, and power supply insufficient. For the insufficient power supply, operation S401 and operation S402 may be performed.

For the surplus power supply, the power that is input by the first power source to the second UPS may also be increased. The quantity of electricity of the first energy storage apparatus may be detected. When the quantity of electricity of the first energy storage apparatus is greater than a quantity of electricity in the surplus state, it is determined that an input power state corresponding to the first energy storage apparatus is power supply surplus.

Power utilization of the data center is improved by using the method provided in this embodiment of this application.

This embodiment of this application can be applied to a 2N power supply architecture, a DR power supply architecture, and an N+R power supply architecture. For the first device, reliability of the power supply system is not reduced. For details, refer to descriptions in FIG. 5 to FIG. 11.

In some embodiments, the data center further includes at least one third device, where the importance of the service in the first device is higher than importance of a service in each third device, and the service in each third device is transferable.

The power supply apparatus further includes a third UPS and a fourth UPS, where the third UPS is configured to control a second power source and a third energy storage apparatus to supply backup electrical energy to the first device, and the fourth UPS is configured to control the second power source and a fourth energy storage apparatus to supply power to the at least one third device.

The method provided in this embodiment of this application can be applied to an N+R power supply architecture.

A power supply module corresponding to a redundancy (R) includes a third UPS and a fourth UPS. In a normal case, power that is input by the second power source to the fourth UPS is rated power of the second power source. When the third UPS supplies power to the first device, the third UPS may supply power to the first device by referencing the power supply manner of the first UPS, and the fourth UPS may supply power to the at least one third device by referencing the power supply manner of the second UPS.

In some embodiments, the data center further includes at least one third device, where the importance of the service in the first device is higher than importance of a service in each third device, and the service in each third device is transferable.

The power supply apparatus further includes a third UPS and a fourth UPS. The third UPS is configured to control a second power source and a third energy storage apparatus to supply power to the first device, and the fourth UPS is configured to control the second power source and a fourth energy storage apparatus to supply power to the at least one third device.

The method provided in this embodiment of this application can be applied to a distribution redundancy (DR) power supply architecture.

A sum of rated power that is input by the first power source to the first UPS and rated power that is input by the second power source to the third UPS is equal to the rated power of the first device. The rated power of the first device may be greater than or equal to the average power of the first device.

Figure 5:
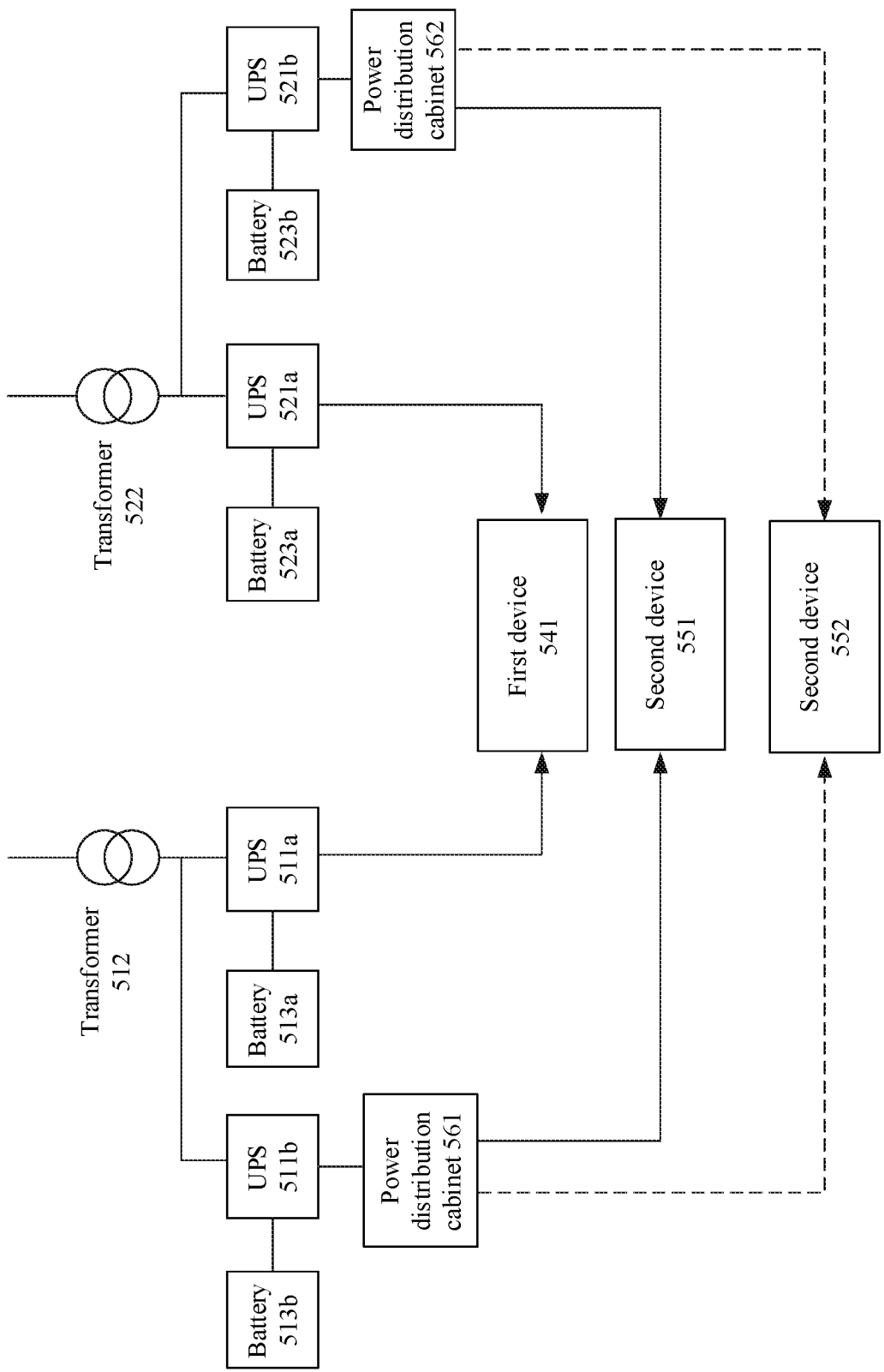
FIG. 5 is a schematic diagram of a structure of a power supply system according to an embodiment of this application.

FIG. 5 is a schematic diagram of a structure of a power supply system according to an embodiment of this application.

Both output power of a transformer 512 and output power of a transformer 522 are 1. Power may also be referred to as a capacity. Sources of electricity of the transformer 512 and the transformer 522 may be a mains supply.

The mains supply is input to a UPS 511a and a UPS 511b after passing through the transformer 512. Both maximum power of the UPS 511a and maximum power of the UPS 511b are 1. The UPS 511a supplies power to a first device 541. Rated power of the first device 541 is 1, and peak power of the first device 541 may be greater than 1. The UPS 511b supplies power to a second device 551.

When input power of the UPS 511a is insufficient, the input power of the UPS 511a and electrical energy stored in a battery 513a jointly supply power to the first device 541. This can implement joint power supply performed by the UPS 511a and the battery 513a, that is, joint power supply performed by the battery and the mains supply. Likewise, when input power of the UPS 511b is insufficient, a battery 513b and the UPS 511b perform joint power supply.

The mains supply is input to a UPS 521a and a UPS 521b after passing through the transformer 522. Both rated power of the UPS 521a and rated power of the UPS 521b are 1. The UPS 521a supplies power to the first device 541, and the UPS 521b supplies power to the second device 551. When input power is insufficient, the UPS 521a and a battery 523a, and the UPS 521b and a battery 523b may separately implement joint power supply performed by the batteries and the mains supply.

Backup electricity times of the battery 513a and the battery 523a are both t, and quantities of backup electricity of the battery 513a and the battery 523a are both Q. The backup electricity time t is generally 5 to 15 minutes (min). The rated power of the first device 541 is Pa, where Q=Pa×t.

When a capacity of the mains supply is insufficient, the UPS 511a and the UPS 521a may implement joint power supply performed by the mains supply and the batteries. For example, power that can be supplied by the mains supply to both the UPS 511a and the UPS 521a is 0.5. When load of the UPS 511a exceeds 0.5, the UPS 511a may enable a mode in which the mains supply and the battery perform joint power supply, so that the mains supply supplies energy with power of 0.5, and remaining energy is supplemented by the battery 513a.

Instantaneous peak power of the first device 541 is Pp, and maximum duration of Pp is ta. For a quantity Q of backup electricity of the battery 513a and the battery 523a, impact of the instantaneous peak power may also be considered, to meet a peak power requirement of an important load. Therefore, the quantity Q of backup electricity may be expressed as Q=Pa×t+Pp×ta.

Considering impact of system efficiency X, the quantity of backup electricity is $$Q = \frac{Pa \times t + Pp \times ta}{X}.$$

Rated power of the second device 551 is 1, and peak power of the second device 551 may be greater than 1. A service in the second device is quickly transferable to a second device 552 or another second device (not shown in FIG. 5).

Switches are disposed in a power distribution cabinet 561 and a power distribution cabinet 562.

A signal cable may be disposed between devices shown in FIG. 5, so that the devices can communicate with each other. For example, a signal cable exists between two second devices that perform service transfer, to implement service transfer.

Figure 6:
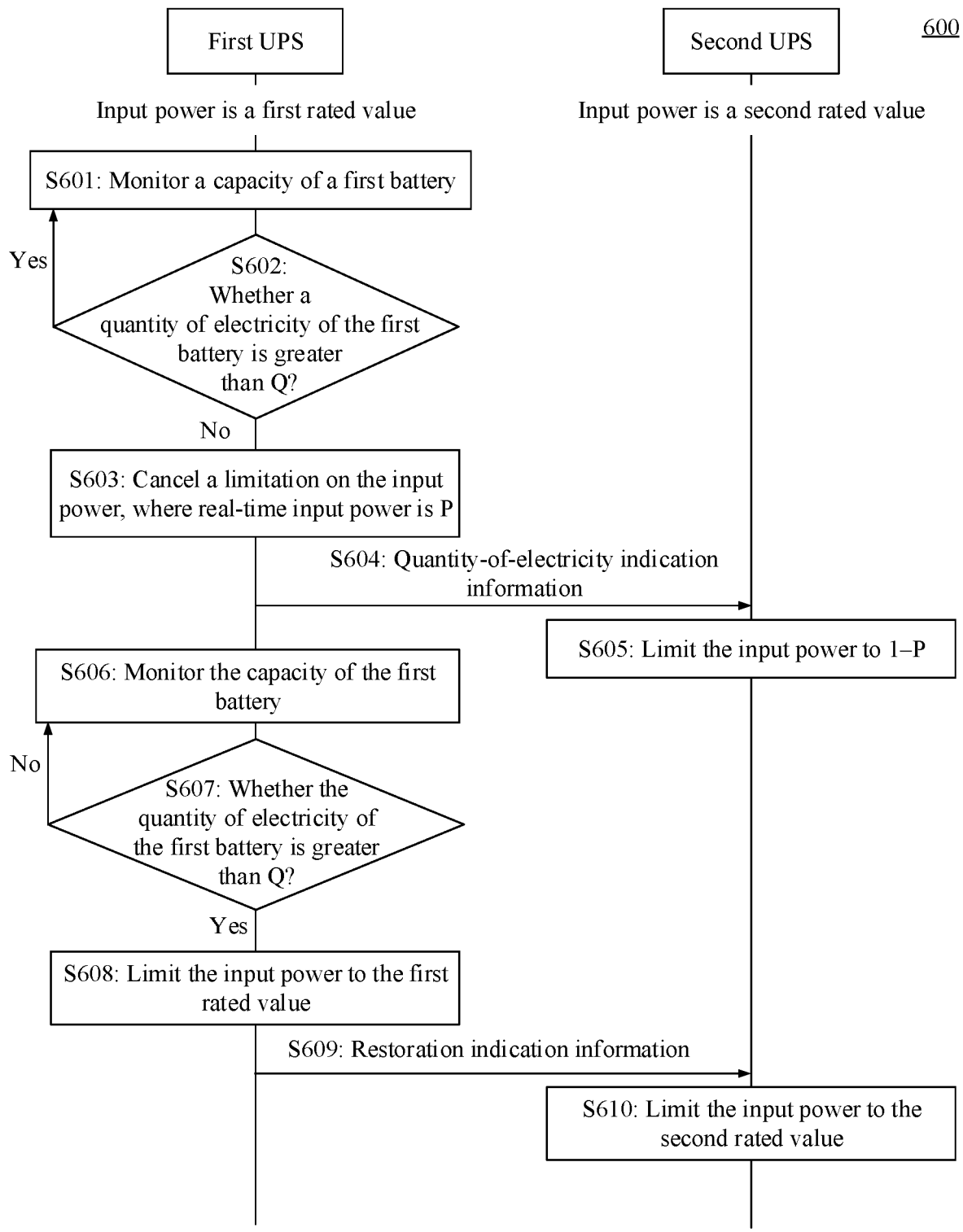
FIG. 6 is a schematic flowchart of a power supply method according to an embodiment of this application.
Figure 7:
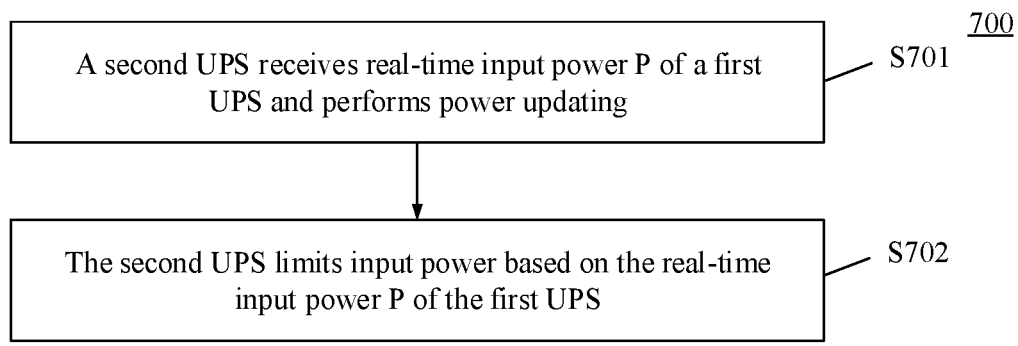
FIG. 7 is a schematic flowchart of another power supply method according to an embodiment of this application.
Figure 8:
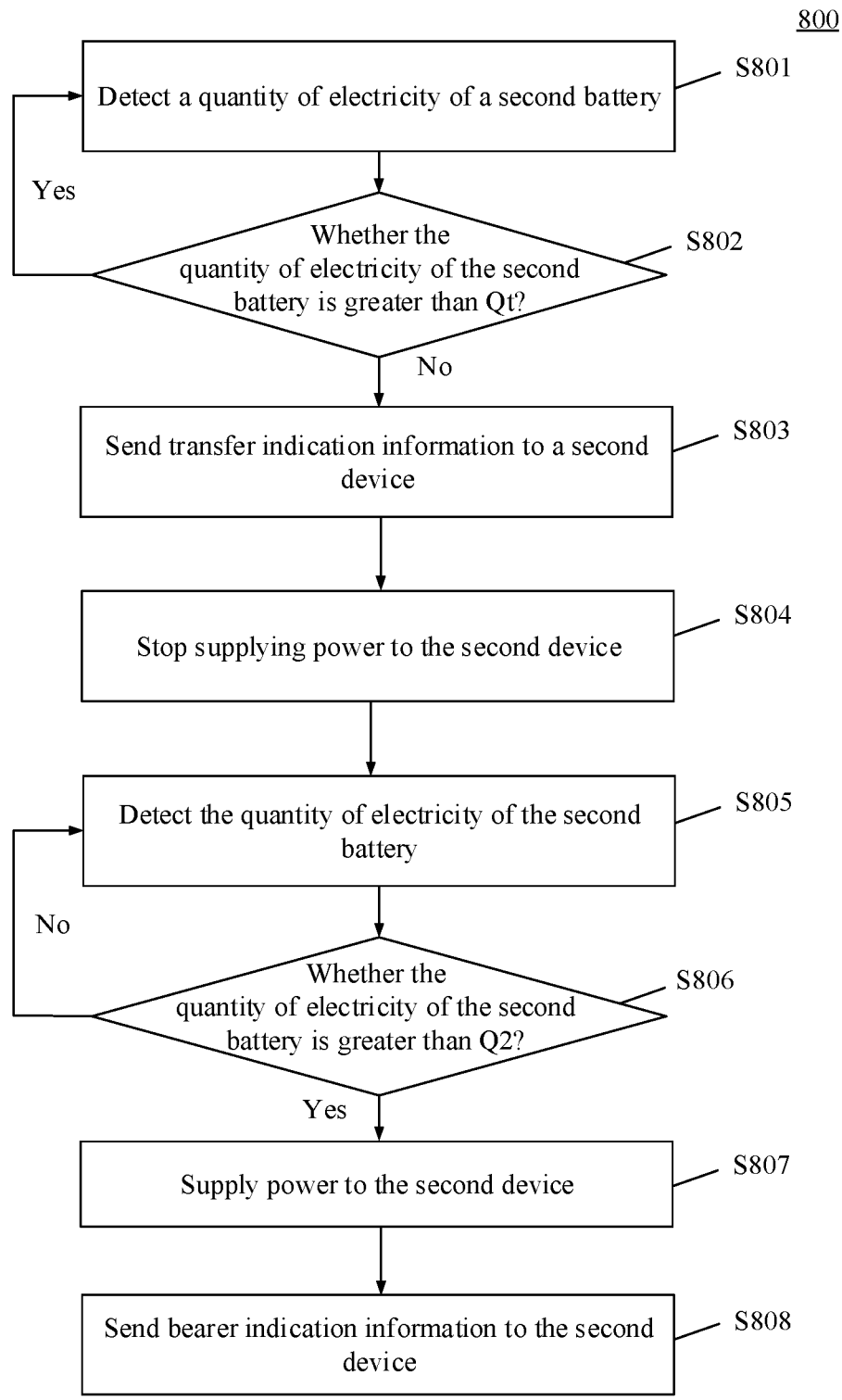
FIG. 8 is a schematic flowchart of still another power supply method according to an embodiment of this application.

For a running principle of the power supply system shown in FIG. 5, refer to descriptions in FIG. 6 to FIG. 8. The UPS 511a and the UPS 521a each may be considered as a first UPS. The UPS 511b and the UPS 521b each may be considered as a second UPS.

In the power supply method provided in this embodiment of this application, it can be ensured that the first device 541 in a downstream of the UPS 511a and the UPS 521a meets a backup electricity time requirement corresponding to a power supply 2N backup and the quantity Q of backup electricity, to ensure that reliability of the first device 541 is not lower than that of the 2N architecture.

The UPS 511b and the UPS 521b may further supply power to the second device 552.

In a conventional 2N structure, a specific margin usually may be set for a rated capacity of a device, that is, the rated capacity of the device is greater than an average capacity of the device. To improve power utilization, in the power supply architecture shown in FIG. 5, an average capacity of a device may be set to a rated capacity of the device. Therefore, the UPS 511b and the UPS 521b may further supply power to the second device 552 when capacities of the transformer 512 and the transformer 522 remain unchanged.

When the UPS 511b supplies power to the second device 551 and the second device 552, a time in which a preset quantity Qt of electricity can support running of the second device 551 and the second device 552 is duration tx. Within the duration tx, the second device 551 and the second device 552 may transfer services to other second devices simultaneously or sequentially.

The UPS 511b may stop supplying power to the second device 551 and/or the second device 552.

Some or all of switches in the power distribution cabinet 561 are turned off sequentially, that is, all or some of the switches are powered off, until the input power of the UPS 511b can meet a power requirement of a second device that is not disconnected. For example, the power distribution cabinet 561 may be disconnected from the second device 551, so that the UPS 511b stops supplying power to the second device 551, and continues supplying power to the second device 552.

The UPS 521b may also stop supplying power to the second device 551 and/or the second device 552.

When stopping supplying power to all second devices, the UPS 511b may disable a power supply function, that is, may turn off a circuit configured to supply power, to reduce power consumption.

In the power supply method provided in this embodiment of this application, on a basis of the conventional 2N power supply architecture, the power supply module supplies power to an added second device, and a service in the added second device is transferable. When power supply of the original first device is insufficient, the service in the second device is transferred, and the power supply module stops supplying power to the second device, to preferentially ensure that the original first device is supplied with power. For the first device, reliability of the power supply module in the power supply method provided in this embodiment of this application is equal to the reliability of the power supply module in the conventional 2N power supply architecture, and power utilization of the system is improved. The power utilization of the system can be increased to 100%.

FIG. 6 is a schematic flowchart of a power supply method 600.

A first UPS may supply power to a first device by using both a first power source and a first battery. A second UPS may supply power to a second device by using both the first power source and a second battery. The first UPS may limit, based on a quantity of electricity of the first battery, power that is input by the first power source to the first UPS. A service priority of the first device is higher than a service priority of the second device. A service in the second device is transferable.

When power that is input by the first power source to the first UPS is insufficient, a mode in which a mains supply and the battery perform joint power supply is enabled. In other words, when the power that is input by the first power source to the first UPS cannot meet a requirement of the first device, an insufficient power part is supplied by the first battery.

When the power that is input by the first power source to the first UPS is higher than the power requirement of the first device, the first UPS may charge the first battery.

Before operation S601 is performed, the power that is input by the first power source to the first UPS is a first rated value, and the power that is input by the first power source to the second UPS is a second rated value. A sum of the first rated value and the second rated value is output power of the power source. In the power supply architecture shown in FIG. 5, the first rated value may be half of average power of a first IT device.

Operation S601: The first UPS detect the quantity of electricity of the first battery.

Operation S602: The first UPS determines a value relationship between the quantity of electricity of the first battery and a quantity Q of backup electricity of the first battery.

If the quantity of electricity of the first battery is greater than the quantity Q of backup electricity of the first battery, operation S601 continues to be performed to monitor the quantity of electricity of the first battery.

If the quantity of electricity of the first battery is less than or equal to the quantity Q of backup electricity of the first battery, operation S603 to operation S607 are performed.

Operation S603: The first UPS cancels the limitation on the input power. To be specific, after operation S603 is performed, the power that is input by the first power source to the first UPS is no longer limited by the first rated value, but the power that is input by the first power source to the first UPS is determined based on the power requirement of the first device and a charging requirement of the first battery.

After the limitation on the input power is canceled, real-time input power of the first UPS is P.

After operation S603 is performed, it can be preferentially ensured that the first device in the downstream of the first UPS meets the backup electricity time requirement corresponding to the quantity Q of backup electricity.

Operation S604: The first UPS sends quantity-of-electricity indication information to the second UPS.

The quantity-of-electricity indication information is used to indicate the second UPS to limit the input power to 1−P.

Operation S605: The second UPS limits the input power to 1−P based on the quantity-of-electricity indication information.

After operation S605 is performed, the second UPS supplies power to the second device with the input power limited to 1−P.

Operation S606: The first UPS detect a capacity of the first battery.

Operation S607: The first UPS determines the value relationship between the quantity of electricity of the first battery and the quantity Q of backup electricity of the first battery.

If the quantity of electricity of the first battery is less than or equal to the quantity Q of backup electricity of the first battery, operation S606 continues to be performed to monitor the capacity of the first battery.

If the quantity of electricity of the first battery is greater than the quantity Q of backup electricity of the first battery, operations S608 to S610 are performed.

Operation S608: The first UPS limits the input power to the first rated value.

After operation S608 is performed, the first UPS supplies power to the first device with the input power limited to the first rated value.

Operation S609: The first UPS sends restoration indication information to the second UPS.

The restoration indication information is used to indicate the second UPS to limit the input power to the second rated power.

Operation S610: The second UPS limits the input power to the second rated power based on the restoration indication information.

After operation S610 is performed, the second UPS supplies power to the second device with the input power limited to the second rated value.

After operation S610 is performed, operation S601 may be performed to detect the quantity of electricity of the first battery in real time.

FIG. 7 is a schematic flowchart of a power supply method 700.

After the second UPS receives the quantity-of-electricity indication information in operation S604, and before the second UPS receives the restoration indication information in operation S609, the second UPS may perform operation S701 and operation S702.

Operation S701: The second UPS receives the real-time input power P of the first UPS and performs power updating.

Operation S702: The second UPS limits the input power based on the real-time input power P of the first UPS.

When power that is input by the first power source to the second UPS is insufficient, the mode in which the mains supply and the battery perform joint power supply is enabled. In other words, when the power that is input by the first power source to the second UPS cannot meet a requirement of the second device, an insufficient power part is supplied by the second battery.

When the power that is input by the first power source to the second UPS is higher than the power requirement of the second device, the second UPS may charge the second battery.

FIG. 8 is a schematic flowchart of a power supply method 800.

The method 800 may be performed at any stage of the method 600. The method 800 may be performed before operation S604, may be performed between operation S604 to operation S609, or may be performed after operation S609.

When the input power is insufficient, the second UPS enables the mode in which the mains supply and the battery perform joint power supply. In other words, when the power that is input by the first power source to the second UPS cannot meet a requirement of the second device, an insufficient power part is supplied by the second battery.

It should be understood that insufficiency of the power that is input by the first power source to the second UPS may be caused by the limitation on the input power, or may be caused by a power failure.

Operation S801: The second UPS detects a quantity of electricity of the second battery.

Operation S802: The second UPS determines a value relationship between the quantity of electricity of the second battery and a preset quantity Qt of electricity.

The second UPS may monitor the quantity of electricity of the second battery in real time. When the quantity of electricity of the second battery does not meet the preset quantity Qt of electricity, the second UPS sends transfer indication information to the second device. The transfer indication information is used by the second device to start transferring the service.

The preset quantity Qt of electricity may be determined by a time needed to transfer the service in the second device. A time in which the preset quantity Qt of electricity can support running of the second device is duration tx. Within the duration tx, the service in the second device is safely transferable to another device.

After operation S803 is completed and the duration tx has elapsed, operation S804 is performed.

Operation S804: The second UPS stops supplying power to the second device.

The UPS may send disconnection indication information to a power distribution cabinet. The disconnection indication information is used to indicate a switch that is in the power distribution cabinet and that is used to connect the second UPS to the second device to be turned off, so that the second UPS stops supplying power to the second device.

The second device is supplied with power by at least one second UPS. When receiving transfer indication information sent by all or some of the at least one second UPS, the second device may transfer the service.

When a quantity of electricity of a battery corresponding to each of the at least one second UPS is insufficient, the second device starts service transfer and transfers the service to another device, to cope with a power failure event that may occur at any time.

The second devices may also communicate with each other. When a sum of quantities of electricity of at least one second battery corresponding to the at least one second device is less than or equal to the preset quantity Qt of electricity, operation S803 and operation S804 are performed.

Operation S805: The second UPS detects the quantity of electricity of the second battery.

Operation S806: The second UPS determines a value relationship between the quantity of electricity of the second battery and a quantity Q2 of backup electricity of the second battery.

When the quantity of electricity of the second battery does not exceed the quantity Q2 of backup electricity of the second battery, operation S806 is performed to continue detecting the quantity of electricity of the second battery.

When the quantity of electricity of the second battery exceeds the quantity Q2 of backup electricity of the second battery, operations S807 and S808 may be performed.

In some embodiments, when the power that is input by the first power source to the second UPS reaches a preset power value, operations S807 and S808 may be performed.

The quantity Q2 of backup electricity of the second battery may be a quantity of electricity that supports running of the second IT device 551 for a preset period of time. For example, the quantity Q2 of backup electricity can support running of the second device for 5 minutes to 10 minutes. The quantity Q2 of backup electricity may be greater than or equal to the preset quantity Qt of electricity. In other words, a time in which the quantity Q2 of backup electricity of the second battery supports running of the second device satisfies at least the time needed to transfer the service in the second device.

Operation S807: The second UPS supplies power to the second device.

The second UPS may indicate the power distribution cabinet to close the switch used to connect the second UPS to the second device, so that the second UPS can supply power to the second device.

In the period when the second UPS stops supplying power to the second device, the second UPS may charge the second battery.

When the second UPS detects that the quantity of electricity of the second battery reaches the quantity Q2 of backup electricity of the second battery, the second UPS may start to supply power to the second device.

If the second UPS supplies power to the at least one second device, the quantity Q2 of backup electricity of the second battery may be a quantity of electricity that supports running of all or some of the at least one second device for a backup electricity time. If Q2 is a quantity of electricity that supports running of some of the at least one second device for the backup electricity time, the second UPS may supply power to the some second devices in operation S807.

After the second UPS detects that the quantity of electricity of the second battery reaches the quantity Q2 of backup electricity of the second battery, the second UPS may monitor the input power in real time. When the power that is input by the first power source to the second UPS is greater than the preset power value, the second UPS may start to supply power to the second device.

Alternatively, in the period when the second UPS stops supplying power to the second device, the second UPS may only detect the input power. After a switch power-off event occurs in the power distribution cabinet due to insufficient input power, when the power that is input by the first power source to the second UPS reaches the preset power value, the second UPS is started and quickly charges the second battery. When the quantity of electricity of the second battery reaches the quantity Q2 of backup electricity of the second battery, the second UPS indicates the power distribution cabinet to close the switch used to connect the second UPS to the second device, so that the second UPS starts to supply power to the second device.

The preset power value is set in the second UPS. Preferably, the preset power value may be greater than or equal to average power of the second device.

In some embodiments, operation S808 may be further performed. Operation S808: The second UPS sends bearer indication information to the second device. The bearer indication information is used to indicate that the second device can bear the service.

Alternatively, the second device may start to bear the service after being supplied with power.

Figure 9:
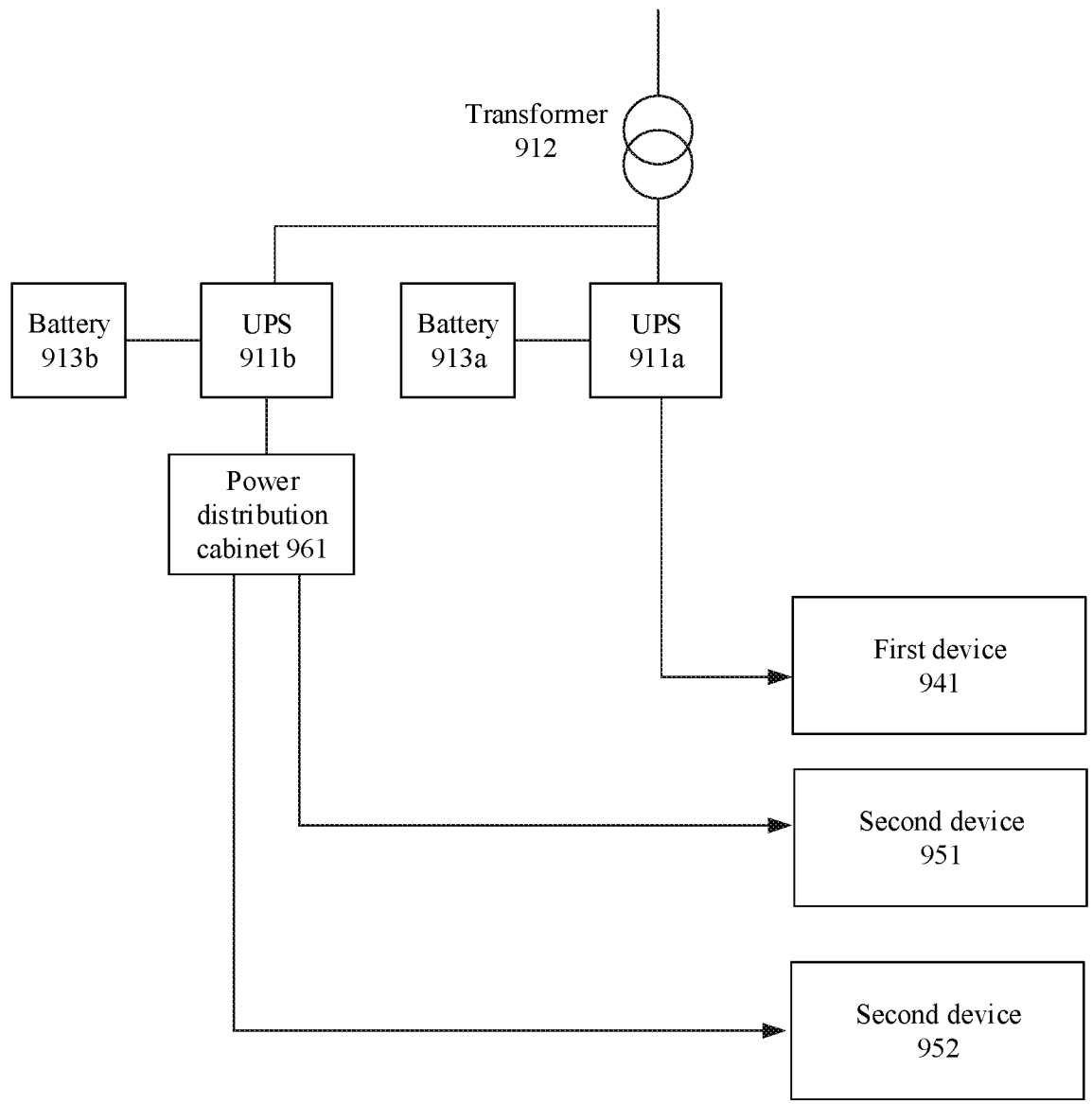
FIG. 9 is a schematic diagram of a structure of another power supply system according to an embodiment of this application.

FIG. 9 is a schematic diagram of a structure of a power supply system according to an embodiment of this application.

A transformer 912 supplies a stable alternating current voltage. A source of electricity of the transformer 912 may be a mains supply.

A UPS 911a supplies power to a first device 941, and a UPS 911b supplies power to a second device 951 and a second device 952. The first device 941 may provide a cloud rental service, a private cloud service, or the like. The second device 951 and the second device 952 support quick service transfer. For example, the second device 951 and the second device 952 may provide a public cloud service.

A switch in a power distribution cabinet 961 may control connections between the UPS 911b and the second device 951 and between the UPS 911b and the second device 952. The UPS 911b may supply power to the second device 951 and the second device 952, and power supplied by the UPS 911b may be adjusted in the second device 951 and the second device 952 based on power requirements of the two devices.

For power supply methods performed by the UPS 911a and the UPS 911b, refer to the descriptions in FIG. 6 to FIG. 8. The UPS 911a may be understood as a first UPS, and the UPS 911b may be understood as a second UPS. The first device 941 may also be referred to as a first device. Both the second device 951 and the second device 952 are second devices.

The second devices receive quantity-of-electricity indication information sent by the UPS 911b, and start to perform service transfer. The quantity-of-electricity indication information is used to indicate that a quantity of electricity of a battery 913b is insufficient.

Figure 10:
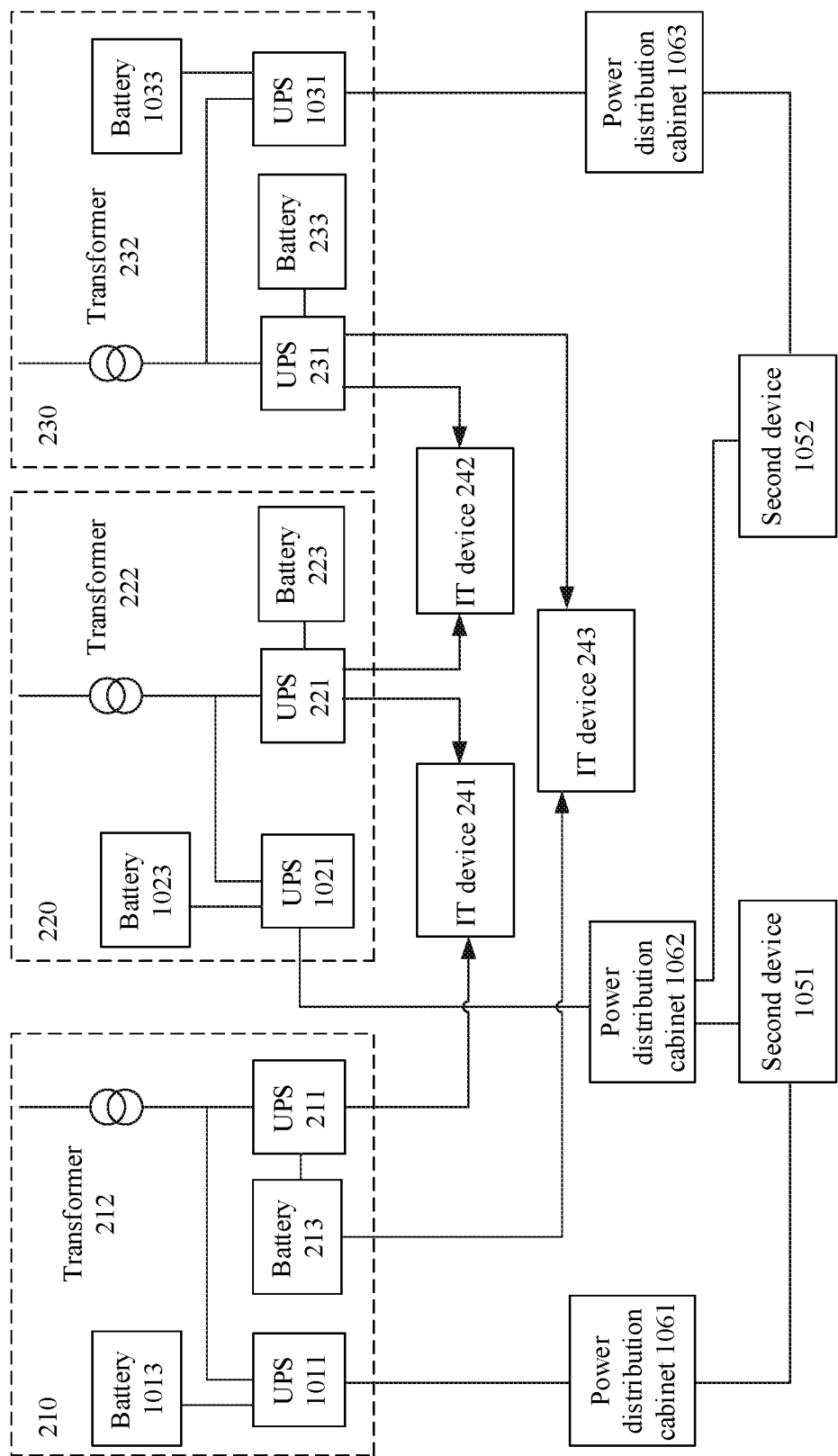
FIG. 10 is a schematic diagram of a structure of still another power supply system according to an embodiment of this application.

FIG. 10 is a schematic diagram of a structure of a power supply system according to an embodiment of this application.

The DR architecture shown in FIG. 2 may be improved to improve power utilization of the power supply system. In the DR architecture (2+1) shown in FIG. 2, power utilization of each power supply module is 66.7% without considering the margin that is set for the rated power.

A UPS 1011 and a battery 1013 are added to the power supply module 210, a UPS 1021 and a battery 1023 are added to the power supply module 220, and a UPS 1031 and a battery 1033 are added to the power supply module 230. The UPS and the battery added to each power supply module are configured to implement joint power supply performed by a mains supply and the battery. A sum of input power of two UPSs in each power supply module is rated output power of a transformer. It should be understood that, generally, the rated output power of the transformer is a constant value. In the DR architecture shown in FIG. 2, remaining power, that is, power of 33.3%, of each power supply module may be output by the UPS 1011, the UPS 1021, and the UPS 1031 to the second device, to support running of the second device.

Each of the UPS 1011, the UPS 1021, and the UPS 1031 may supply power to one or more second devices.

For example, as shown in FIG. 10, the UPS 1011 supplies power to a second device 1051, and is connected to the second device 1051 through a power distribution cabinet 1061. The UPS 1021 supplies power to the second device 1051 and a second device 1052, and is connected to the second device 1051 and the second device 1052 through a power distribution cabinet 1062. The UPS 1031 supplies power to the second device 1052, and is connected to the second device 1052 through a power distribution cabinet 1063.

For a power supply method performed by the added UPS and the original UPS in each power supply module, refer to the descriptions in FIG. 6 to FIG. 8. The UPS 1011, the UPS 1021, and the UPS 1031 each may be understood as a second UPS, and the UPS 211, the UPS 221, and the UPS 231 each may be understood as a first UPS.

Figure 11:
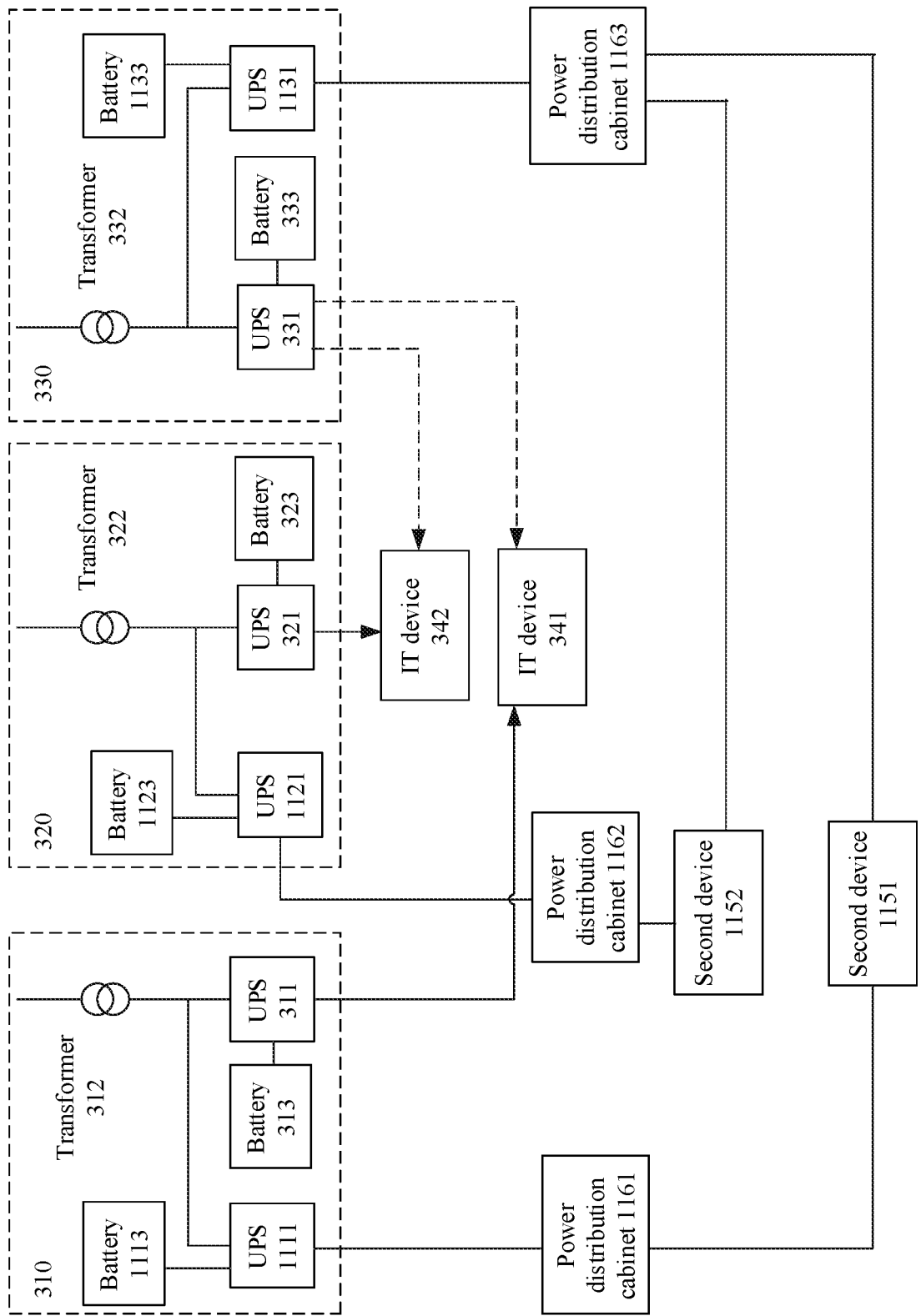
FIG. 11 is a schematic diagram of a structure of yet another power supply system according to an embodiment of this application.

FIG. 11 is a schematic diagram of a structure of a power supply system according to an embodiment of this application.

The N+R architecture shown in FIG. 3 may be improved to improve power utilization of the power supply system. In the N+R architecture (2+1) shown in FIG. 3, power utilization of the power supply module 330 is 0.

In the power supply architecture shown in FIG. 11, a UPS 1131 and a battery 1133 are added to the power supply module 330, and the UPS 1131 and the battery 1133 are configured to supply power to a second device 1152 and a second device 1151, to improve the power utilization of the power supply module 330.

In addition, because there are margins for maximum values that are set for input power of the power supply module 310, the power supply module 320, and the power supply module 330, that is, the maximum values of the input power of the power supply module 310, the power supply module 320, and the power supply module 330 are greater than average power of the IT device 341 and average power of the IT device 342. In other words, power supplied by the transformer 312 is greater than the average power of the IT device 341, and power supplied by the transformer 322 is greater than the average power of the IT device 342, so that the power utilization of the power supply architecture is low.

A UPS 1111 and a power source 1113 are added to the power supply module 310, and a UPS 1121 and a power source 1123 are added to the power supply module 320. A rated value of input power of the UPS 311 is set to the average power of the IT device 341, and the power supplied by the transformer 312 may be further used to supply power to the second device 1151 through the UPS 1111. A rated value of input power of the UPS 321 is set to the average power of the IT device 342, and the power supplied by the transformer 322 may be further used to supply power to the second device 1152 through the UPS 1121. Therefore, power utilization of the power supply module 310, the power supply module 320, and the power supply module 330 can be improved to 100%.

For power supply methods performed by the UPSs, refer to the descriptions in FIG. 6 to FIG. 8. The UPS 311, the UPS 321, and the UPS 331 each may be understood as a first UPS, the UPS 1111, the UPS 1121, and the UPS 1131 each may be understood as a second UPS, and the IT device 341 and the IT device 342 each may be understood as a first device.

A switch in a power distribution cabinet 1161 may control a connection between the UPS 1111 and the second device 1151. A switch in a power distribution cabinet 1162 may control a connection between the UPS 1121 and the second device 1152. A switch in a power distribution cabinet 1163 may control connections between the UPS 1131 and the second device 1151 and between the UPS 1131 and the second device 1152.

Figure 12:
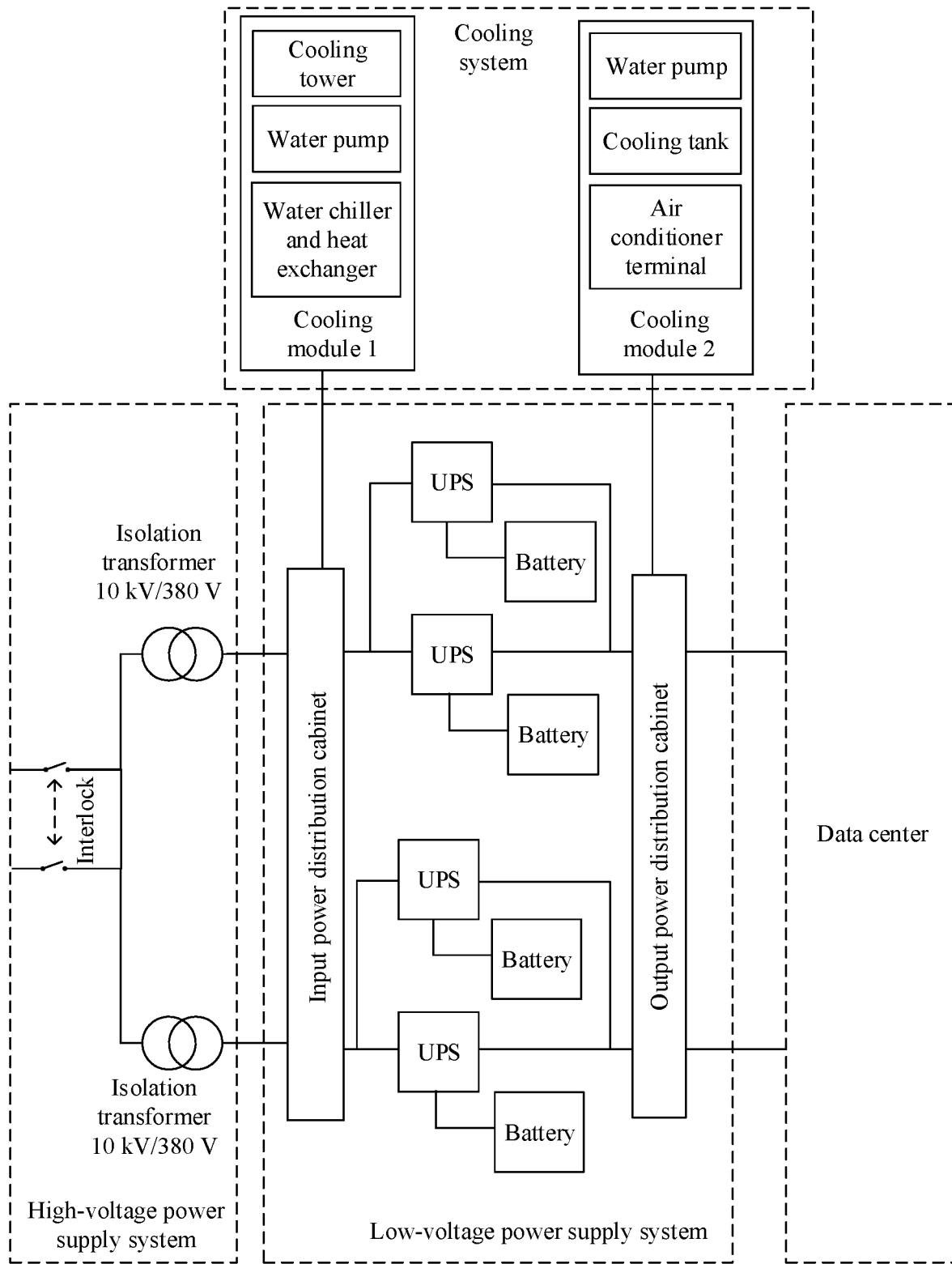
FIG. 12 is a schematic diagram of a structure of still yet another power supply system according to an embodiment of this application.

FIG. 12 is a schematic diagram of a structure of a power supply system according to an embodiment of this application.

A high-voltage power supply system includes isolation transformers. The isolation transformers may be configured to convert high voltage electricity to obtain low voltage electricity. For example, the isolation transformers in the high-voltage power supply system may convert 10 kV high voltage electricity into a 380 V mains supply.

A low-voltage power supply system may be configured to supply power to a data center. The low-voltage power supply system includes an input power distribution cabinet, an output power distribution cabinet, UPSs, batteries, and the like.

Technical solutions in embodiments of this application can be applied to the low-voltage power supply system. One UPS and one battery are added to an existing power supply module including one UPS and one battery. A second device is added to the data center. The added UPS and battery may supply power to the second device, and a service in the second device is transferable.

When power supply of an original device in the data center is insufficient, power-source power supplied by a power source to the second device is reduced, to ensure power supply of the original device in the data center. The power supply system provided in this embodiment of this application can improve power utilization.

Devices in the data center may be dual power supply loads, that is, each device is supplied with power by two power supply modules. This reduces a probability of a power failure of a device in the low-voltage system.

The low-voltage power supply system generates heat in a running process. A cooling system can cool the low-voltage power supply system. In the cooling system, a first cooling module may be configured to cool the input power distribution cabinet, and a second cooling module may be configured to cool the output power distribution cabinet.

The first cooling module includes a cooling tower, a water pump, a water chiller, a heat exchanger, and the like. The second cooling module includes a water pump, a cooling tank, an air conditioner terminal, and the like. The input power distribution cabinet may be configured to connect each power supply module to the high-voltage power supply system. The output power distribution cabinet may be configured to connect each power supply module to the data center.

The foregoing describes the method embodiments in embodiments of this application with reference to FIG. 1 to FIG. 12. The following describes apparatus embodiments in embodiments of this application with reference to FIG. 13 and FIG. 14. It should be understood that the descriptions of the method embodiments correspond to descriptions of the apparatus embodiments. Therefore, for a part that is not described in detail, refer to the foregoing method embodiments.

Figure 13:
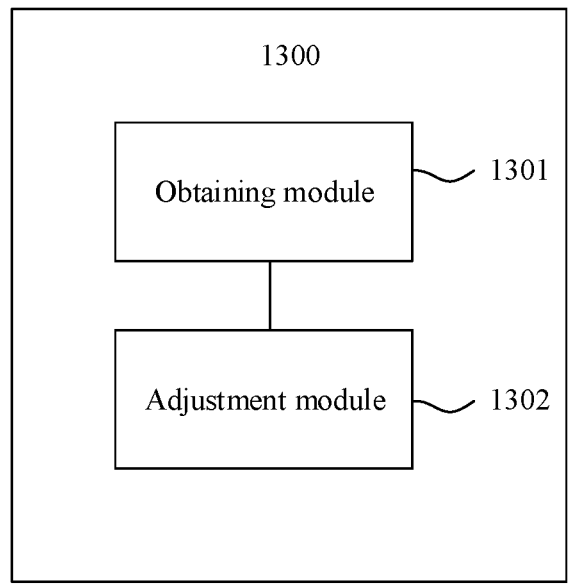
FIG. 13 is a schematic diagram of a structure of an uninterruptible power supply apparatus according to an embodiment of this application.

FIG. 13 is a schematic diagram of a structure of a control apparatus 1300 for a power supply apparatus in a data center according to an embodiment of this application. The control apparatus 1300 may be referred to as a UPS unit or a UPS apparatus.

The control apparatus 1300 is configured to supply power to the data center. The data center includes a first device and at least one second device, importance of a service in the first device is higher than importance of a service in each second device, and the service in each second device is transferable.

The power supply apparatus includes a first uninterruptible power supply UPS and a second UPS, the first UPS is configured to control a first power source and a first energy storage apparatus to supply power to the first device, and the second UPS is configured to control the first power source and a second energy storage apparatus to supply power to the at least one second device.

The control apparatus 1300 includes an obtaining module 1301 and an adjustment module 1302.

The obtaining module 1301 is configured to obtain a quantity of electricity of the first energy storage apparatus.

The adjustment module 1302 is configured to: when the quantity of electricity of the first energy storage apparatus is less than or equal to a first preset quantity of electricity, reduce input power that is input by the first power source to the second UPS.

In some embodiments, the quantity of backup electricity is used to indicate a quantity of electricity needed when duration of service running of the first device is greater than or equal to preset duration.

In some embodiments, the adjustment module 1302 is further configured to: when the quantity of electricity of the first energy storage apparatus is greater than a second preset quantity of electricity, stop reducing the input power that is input by the first power source to the second UPS, where the second preset quantity of electricity is greater than or equal to the first preset quantity of electricity.

In some embodiments, the control apparatus 1300 further includes a transceiver module. The transceiver module is configured to: when a quantity of electricity of the second energy storage apparatus is less than a third preset quantity of electricity, send transfer indication information to at least one target second device in the at least one second device, where the transfer indication information is used to indicate the at least one target second device to transfer a service.

In some embodiments, the obtaining module 1301 is further configured to obtain the quantity of electricity of the second energy storage apparatus.

In some embodiments, a time in which the third preset quantity of electricity supports running of the at least one target second device is greater than or equal to a transfer time of the service in the at least one target second device.

In some embodiments, the adjustment module 1302 is configured to determine, based on a power requirement of the first device for the first power source, the input power that is input by the first power source to the second UPS.

In some embodiments, before the input power that is input by the first power source to the second UPS is reduced, a rated value of power that is input by the first power source to the first UPS is equal to average power of the first device.

In some embodiments, the power supply apparatus further includes a third UPS and a fourth UPS. The third UPS is configured to control a second power source and a third energy storage apparatus to supply backup electrical energy to the first device, and the fourth UPS is configured to control the second power source and a fourth energy storage apparatus to supply power to at least one third device. The importance of the service in the first device is higher than importance of a service in each third device, and the service in each third device is transferable.

In some embodiments, the data center further includes at least one third device. The importance of the service in the first device is higher than importance of a service in each third device, and the service in each third device is transferable.

The power supply apparatus further includes a third UPS and a fourth UPS. The third UPS is configured to control a second power source and a third energy storage apparatus to supply power to the first device, and the fourth UPS is configured to control the second power source and a fourth energy storage apparatus to supply power to the at least one third device.

It should be understood that the control module 1300 may be a controller in the first UPS or the second UPS, or may be a controller in another unit or device. The first UPS may communicate with the second UPS, to implement signal transmission between the first UPS and the second UPS.

Figure 14:
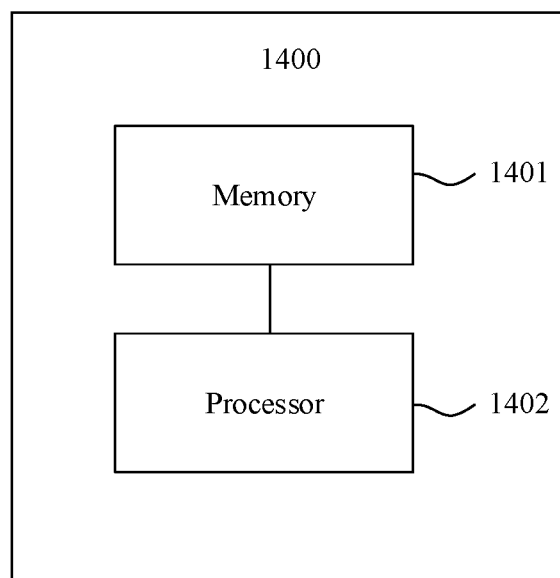
FIG. 14 is a schematic diagram of a structure of another uninterruptible power supply apparatus according to an embodiment of this application.

FIG. 14 is a schematic diagram of a structure of an uninterruptible power supply apparatus according to an embodiment of this application.

A control apparatus 1400 is configured to supply power to a data center. The data center includes a first device and at least one second device, importance of a service in the first device is higher than importance of a service in each second device, and the service in each second device is transferable.

The power supply apparatus includes a first uninterruptible power supply UPS and a second UPS, the first UPS is configured to control a first power source and a first energy storage apparatus to supply power to the first device, and the second UPS is configured to control the first power source and a second energy storage apparatus to supply power to the at least one second device.

The control apparatus 1400 includes a memory 1401 and a processor 1402.

The memory 1401 is configured to store a program.

When executing the program, the processor 1402 is configured to: when a quantity of electricity of the first energy storage apparatus is less than or equal to a first preset quantity of electricity, reduce input power that is input by the first power source to the second UPS.

In some embodiments, the quantity of backup electricity is used to indicate a quantity of electricity needed when duration of service running of the first device is greater than or equal to preset duration.

In some embodiments, the processor 1402 is further configured to: when the quantity of electricity of the first energy storage apparatus is greater than a second preset quantity of electricity, stop reducing the input power that is input by the first power source to the second UPS, where the second preset quantity of electricity is greater than or equal to the first preset quantity of electricity.

In some embodiments, the processor 1402 is further configured to: when a quantity of electricity of the second energy storage apparatus is less than a third preset quantity of electricity, send transfer indication information to at least one target second device in the at least one second device, where the transfer indication information is used to indicate the at least one target second device to transfer a service.

It should be understood that the control apparatus 1400 further includes a communications interface, and the transfer indication information is sent by using the communications interface of the control apparatus 1400. The target second device includes a communications interface, and the communications interface of the second device is configured to receive the transfer indication information sent by the control apparatus 1400.

In some embodiments, a time in which the third preset quantity of electricity supports running of the at least one target second device is greater than or equal to a transfer time of the service in the at least one target second device.

In some embodiments, the processor 1402 is further configured to determine, based on a power requirement of the first device for the first power source, the input power that is input by the first power source to the second UPS.

In some embodiments, before the input power that is input by the first power source to the second UPS is reduced, a rated value of power that is input by the first power source to the first UPS is equal to average power of the first device.

In some embodiments, the data center further includes at least one third device. The importance of the service in the first device is higher than importance of a service in each third device, and the service in each third device is transferable.

The power supply apparatus further includes a third UPS and a fourth UPS, where the third UPS is configured to control a second power source and a third energy storage apparatus to supply backup electrical energy to the first device, and the fourth UPS is configured to control the second power source and a fourth energy storage apparatus to supply power to the at least one third device.

In some embodiments, the data center further includes at least one third device. The importance of the service in the first device is higher than importance of a service in each third device, and the service in each third device is transferable.

The power supply apparatus further includes a third UPS and a fourth UPS. The third UPS is configured to control a second power source and a third energy storage apparatus to supply power to the first device, and the fourth UPS is configured to control the second power source and a fourth energy storage apparatus to supply power to the at least one third device.

An embodiment of this application further provides a control apparatus for a power supply apparatus in a data center, including at least one processor and a memory. The memory is configured to store a program. When the program is executed in the at least one processor, the power supply apparatus is enabled to perform the foregoing methods.

An embodiment of this application further provides a computer program storage medium. The computer program storage medium includes program instructions, and when the program instructions are directly or indirectly executed, the foregoing methods are implemented.

An embodiment of this application further provides a chip system. The chip system includes at least one processor, and when program instructions are executed in the at least one processor, the foregoing methods are implemented.

An embodiment of this application further provides a data center. The data center includes a first device, a second device, a power supply apparatus, and the foregoing control apparatus for the power supply apparatus in the control center.

A person of ordinary skill in the art may be aware that, in combination with the examples described in embodiments disclosed in this specification, the units and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed systems, apparatuses, and methods may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or the units may be implemented in electrical, mechanical, or other forms.

The units described as separate parts may or may not be physically separate, and parts displayed as units may or may not be physical units. To be specific, the parts may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technologies, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A control method for a power supply apparatus in a data center, wherein the data center comprises a first device and at least one second device, a service priority of a first service in the first device is higher than a service priority of a second service in the at least one second device, and the second service in the at least one second device is transferable,
   wherein the power supply apparatus comprises a first uninterruptible power supply (UPS) and a second UPS, the first UPS is configured to control a first power source and a first energy storage apparatus to supply power to the first device, and the second UPS is configured to control the first power source and a second energy storage apparatus to supply power to the at least one second device, and
   wherein the method comprises:
   in response to a quantity of electricity of the first energy storage apparatus being less than or equal to a first preset quantity of electricity, reducing input power that is input by the first power source to the second UPS, wherein the first preset quantity of electricity is used to indicate a quantity of electricity needed when a duration of the first service running in the first device is greater than or equal to a preset duration.

2. The method according to claim 1, wherein the method further comprises:
   in response to the quantity of electricity of the first energy storage apparatus being greater than a second preset quantity of electricity, stopping reducing the input power that is input by the first power source to the second UPS, wherein the second preset quantity of electricity is greater than or equal to the first preset quantity of electricity.

3. The method according to claim 1, wherein the method further comprises:
   in response to a quantity of electricity of the second energy storage apparatus being less than a third preset quantity of electricity, sending transfer indication information to at least one target second device in the at least one second device, wherein the transfer indication information is used to indicate the at least one target second device to transfer the second service.

4. The method according to claim 3, wherein a time in which the third preset quantity of electricity supports running of the at least one target second device is greater than or equal to a transfer time of the second service in the at least one target second device.

5. The method according to claim 1, wherein the reducing the input power that is input by the first power source to the second UPS comprises:
   determining, based on a power requirement of the first device for the first power source, the input power that is input by the first power source to the second UPS.

6. The method according to claim 1, wherein before the input power that is input by the first power source to the second UPS is reduced, a rated value of power that is input by the first power source to the first UPS is equal to average power of the first device.

7. The method according to claim 1, wherein:
   the data center further comprises at least one third device, wherein the importance-service priority of the first service in the first device is higher than an importance-a service priority of a third service in the at least one third device, and the third service in the at least one third device is transferable; and the power supply apparatus further comprises a third UPS and a fourth UPS, wherein the third UPS is configured to control a second power source and a third energy storage apparatus to supply power to the first device, and the fourth UPS is configured to control the second power source and a fourth energy storage apparatus to supply power to the at least one third device.

8. The method according to claim 7, wherein the power supplied to the first device comprises backup electrical energy.

9. A control apparatus for a power supply apparatus in a data center, wherein the data center comprises a first device and at least one second device, a service priority of a first service in the first device is higher than a service priority of a second service in the at least one second device, and the second service in the at least one second device is transferable,
   wherein the power supply apparatus comprises a first uninterruptible power supply (UPS) and a second UPS, the first UPS is configured to control a first power source and a first energy storage apparatus to supply power to the first device, and the second UPS is configured to control the first power source and a second energy storage apparatus to supply power to the at least one second device,
   wherein the control apparatus comprises a memory and a processor,
   wherein the memory is configured to store a program, and when executing the program, the processor is configured to:
   in response to a quantity of electricity of the first energy storage apparatus being less than or equal to a first preset quantity of electricity, reduce input power that is input by the first power source to the second UPS, wherein the first preset quantity of electricity is used to indicate a quantity of electricity needed when a duration of the first service running in the first device is greater than or equal to a preset duration.

10. The control apparatus according to claim 9, wherein the processor is further configured to:
   in response to the quantity of electricity of the first energy storage apparatus being greater than a second preset quantity of electricity, stop reducing the input power that is input by the first power source to the second UPS, wherein the second preset quantity of electricity is greater than or equal to the first preset quantity of electricity.

11. The control apparatus according to claim 9, wherein the processor is further configured to:
   in response to a quantity of electricity of the second energy storage apparatus being less than a third preset quantity of electricity, send transfer indication information to at least one target second device in the at least one second device, wherein the transfer indication information is used to indicate the at least one target second device to transfer the second service.

12. The control apparatus according to claim 11, wherein a time in which the third preset quantity of electricity supports running of the at least one target second device is greater than or equal to a transfer time of the second service in the at least one target second device.

13. The control apparatus according to claim 9, wherein the processor is further configured to:
   determine, based on a power requirement of the first device for the first power source, the input power that is input by the first power source to the second UPS.

14. The control apparatus according to claim 9, wherein before the input power that is input by the first power source to the second UPS is reduced, a rated value of power that is input by the first power source to the first UPS is equal to average power of the first device.

15. The control apparatus according to claim 9, wherein:
   the data center further comprises at least one third device, wherein the service priority of the first service in the first device is higher than a service priority of a third service in the at least one third device, and the third service in the at least one third device is transferable; and
   the power supply apparatus further comprises a third UPS and a fourth UPS, wherein the third UPS is configured to control a second power source and a third energy storage apparatus to supply power to the first device, and the fourth UPS is configured to control the second power source and a fourth energy storage apparatus to supply power to the at least one third device.

16. The control apparatus according to claim 15, wherein the power supplied to the first device comprises backup electrical energy.

17. A power supply apparatus in a data center, wherein the power supply apparatus is configured to supply power to the data center, wherein the data center comprises a first device and at least one second device, a service priority of a first service in the first device is higher than a service priority of a second service in the at least one second device, and the second service in the at least one second device is transferable,
   wherein the power supply apparatus comprises a first UPS, a second UPS, and a control apparatus for the power supply apparatus,
   wherein the first UPS is configured to control a first power source and a first energy storage apparatus to supply power to the first device, and the second UPS is configured to control the first power source and a second energy storage apparatus to supply power to the at least one second device,
   wherein the control apparatus comprises a memory and a processor,
   wherein the memory is configured to store a program, and when executing the program, the processor is configured to:
   in response to a quantity of electricity of the first energy storage apparatus being less than or equal to a first preset quantity of electricity, reduce input power that is input by the first power source to the second UPS, wherein the first preset quantity of electricity is used to indicate a quantity of electricity needed when a duration of the first service running in the first device is greater than or equal to a preset duration.

18. The power supply apparatus of claim 17, wherein the processor is further configured to:
   in response to the quantity of electricity of the first energy storage apparatus being greater than a second preset quantity of electricity, stopping reducing the input power that is input by the first power source to the second UPS, wherein the second preset quantity of electricity is greater than or equal to the first preset quantity of electricity.

19. The power supply apparatus of claim 17, wherein the processor is further configured to:
   in response to a quantity of electricity of the second energy storage apparatus being less than a third preset quantity of electricity, sending transfer indication information to at least one target second device in the at least one second device, wherein the transfer indication information is used to indicate the at least one target second device to transfer the second service.

20. The power supply apparatus of claim 19, wherein a time in which the third preset quantity of electricity supports running of the at least one target second device is greater than or equal to a transfer time of the second service in the at least one target second device.

* * * * *

UNITED STATES PATENT AND TRADEMARK OFFICE
CERTIFICATE OF CORRECTION

PATENT NO. : 12,086,007 B2
APPLICATION NO. : 17/852527
DATED : September 10, 2024
INVENTOR(S) : Zhuyong Huang and Xiaofei Zhang Page 1 of 1

It is certified that error appears in the above-identified patent and that said Letters Patent is hereby corrected as shown below:

In the Claims

In Claim 7, Column 30, Line 63, delete "the importance-service" and insert --the service--.

In Claim 7, Column 30, Lines 64-65, delete "than an importance-a service" and insert --than a service--.

Signed and Sealed this
Tenth Day of December, 2024

Katherine Kelly Vidal
*Director of the United States Patent and Trademark Office*